(12) United States Patent     (10) Patent No.: US 7,561,855 B2
Hofmeister et al.     (45) Date of Patent: Jul. 14, 2009

(54) TRANSCEIVER MODULE AND INTEGRATED CIRCUIT WITH CLOCK AND DATA RECOVERY CLOCK DIPLEXING

(75) Inventors: Rudolf J. Hofmeister, Sunnyvale, CA (US); Lewis B. Aronson, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 517 days.

(21) Appl. No.: 11/118,172

(22) Filed: Apr. 29, 2005

(65) Prior Publication Data

US 2005/0281193 A1    Dec. 22, 2005

Related U.S. Application Data

(60) Continuation-in-part of application No. 10/629,301, filed on Jul. 28, 2003, which is a division of application No. 10/420,027, filed on Apr. 17, 2003, now Pat. No. 7,486,894.

(60) Provisional application No. 60/410,509, filed on Sep. 13, 2002, provisional application No. 60/391,877, filed on Jun. 25, 2002.

(51) Int. Cl.
*H04B 1/40* (2006.01)

(52) U.S. Cl. .................. 455/88; 455/231; 455/334; 455/67.11

(58) Field of Classification Search ............ 455/88, 455/550.1, 553.1, 150, 205, 210, 231, 334, 455/67.11, 150.1, 551, 556.1, 234.1, 333; 398/139, 175, 152, 136, 177, 176

See application file for complete search history.

(56) References Cited

U.S. PATENT DOCUMENTS

| 4,359,553 A | 11/1982 | Edwards |
| 4,378,451 A | 3/1983 | Edwards |
| 4,489,477 A | 12/1984 | Chik et al. |

(Continued)

FOREIGN PATENT DOCUMENTS

DE     10065034     8/2001

(Continued)

OTHER PUBLICATIONS

"Application Note: T2525/26/27", copyright 2003 by Atmel Corporation.

(Continued)

*Primary Examiner*—John J Lee
(74) *Attorney, Agent, or Firm*—Workman Nydegger

(57) ABSTRACT

An integrated circuit. The integrated circuit is usable in a transceiver module. The integrated circuit includes an input port that is configured to receive a data stream. A clock port on the integrated circuit is configured to receive a reference clock diplexed with another signal or voltage used by the integrated circuit. An eye opening circuit is connected to the input port and clock. The eye opening circuit is configured to retime the data stream received at the input port. An output port is connected to the eye opening circuits The output port is configured to transmit a retimed signal from the eye opening circuit to a device external to the integrated circuit. A bypass circuit is connected to the input port and the output port. The bypass circuit may selectively bypass the eye opening circuit.

15 Claims, 33 Drawing Sheets

U.S. PATENT DOCUMENTS

| | | | |
|---|---|---|---|
| 4,687,924 A | 8/1987 | Galvin et al. |
| 4,734,914 A | 3/1988 | Yoshikawa |
| 4,747,091 A | 5/1988 | Doi |
| 4,809,286 A | 2/1989 | Kollanyi et al. |
| 4,916,707 A | 4/1990 | Rosenkranz |
| 4,932,038 A | 6/1990 | Windus |
| 5,019,769 A | 5/1991 | Levinson |
| 5,039,194 A | 8/1991 | Block et al. |
| 5,041,491 A | 8/1991 | Turke et al. |
| 5,268,949 A | 12/1993 | Watanabe et al. |
| 5,287,375 A | 2/1994 | Fujimoto |
| 5,334,826 A | 8/1994 | Sato et al. |
| 5,383,208 A | 1/1995 | Queniat et al. |
| 5,392,273 A | 2/1995 | Masaki et al. |
| 5,396,059 A * | 3/1995 | Yeates ................... 250/214 C |
| 5,448,629 A | 9/1995 | Bosch et al. |
| 5,495,358 A | 2/1996 | Bartig et al. |
| 5,516,563 A | 5/1996 | Schumann et al. |
| 5,557,437 A | 9/1996 | Sakai et al. |
| 5,574,435 A | 11/1996 | Mochizuki |
| 5,576,877 A | 11/1996 | Aulet et al. |
| 5,586,123 A | 12/1996 | Baker |
| 5,594,748 A | 1/1997 | Jabr |
| 5,604,758 A | 2/1997 | AuYeung et al. |
| 5,673,282 A | 9/1997 | Wurst |
| 5,706,277 A | 1/1998 | Klink |
| 5,748,672 A | 5/1998 | Smith et al. |
| 5,761,216 A | 6/1998 | Sotome et al. |
| 5,787,114 A | 7/1998 | Ramamurthy et al. |
| 5,801,866 A | 9/1998 | Chan et al. |
| 5,802,073 A | 9/1998 | Platt |
| 5,812,572 A * | 9/1998 | King et al. ............... 372/38.04 |
| 5,854,704 A | 12/1998 | Grandpierre |
| 5,920,414 A | 7/1999 | Miyachi et al. |
| 5,926,303 A | 7/1999 | Giebel et al. |
| 5,953,690 A | 9/1999 | Lemon et al. |
| 5,956,168 A | 9/1999 | Levinson et al. |
| 5,966,395 A | 10/1999 | Ikeda |
| 5,978,417 A | 11/1999 | Baker et al. |
| 5,999,294 A | 12/1999 | Petsko |
| 6,049,413 A | 4/2000 | Taylor |
| 6,055,252 A | 4/2000 | Zhang |
| 6,064,501 A | 5/2000 | Roberts et al. |
| 6,075,634 A * | 6/2000 | Casper et al. ............... 398/139 |
| 6,157,022 A | 12/2000 | Meada et al. |
| 6,160,647 A | 12/2000 | Gilliland et al. |
| 6,175,434 B1 | 1/2001 | Feng |
| 6,188,059 B1 | 2/2001 | Nishlyama et al. |
| 6,198,558 B1 | 3/2001 | Graves et al. |
| 6,205,505 B1 | 3/2001 | Jau et al. |
| 6,215,565 B1 | 4/2001 | Davis et al. |
| 6,222,660 B1 | 4/2001 | Traa |
| 6,229,788 B1 | 5/2001 | Graves et al. |
| 6,252,692 B1 | 6/2001 | Roberts |
| 6,256,127 B1 | 7/2001 | Taylor |
| 6,272,154 B1 | 8/2001 | Bala et al. |
| 6,292,497 B1 | 9/2001 | Nakano |
| 6,313,459 B1 | 11/2001 | Hoffe et al. |
| 6,317,232 B1 | 11/2001 | Fee et al. |
| 6,384,948 B1 | 5/2002 | Williams et al. |
| 6,423,963 B1 | 7/2002 | Wu |
| 6,466,886 B1 | 10/2002 | Marmur |
| 6,469,782 B1 | 10/2002 | Schaepperle |
| 6,473,224 B2 | 10/2002 | Dugan et al. |
| 6,476,949 B1 | 11/2002 | Loh et al. |
| 6,512,617 B1 | 1/2003 | Tanji et al. |
| 6,519,255 B1 | 2/2003 | Graves |
| 6,526,076 B2 | 2/2003 | Cham et al. |
| 6,538,783 B1 | 3/2003 | Stephens |
| 6,570,149 B2 | 5/2003 | Maruyama et al. |
| 6,594,050 B2 | 7/2003 | Jannson et al. |
| 6,631,144 B1 | 10/2003 | Johansen |
| 6,631,146 B2 | 10/2003 | Pontis et al. |
| 6,643,472 B1 | 11/2003 | Sakamoto et al. |
| 6,661,836 B1 | 12/2003 | Dalal et al. |
| 6,661,973 B1 | 12/2003 | Huber et al. |
| 6,665,498 B1 | 12/2003 | Jiang et al. |
| 6,694,462 B1 | 2/2004 | Reis et al. |
| 6,712,527 B1 | 3/2004 | Chan et al. |
| 6,748,181 B2 | 6/2004 | Miki et al. |
| 6,765,445 B2 | 7/2004 | Perrott et al. |
| 6,829,436 B2 | 12/2004 | Koh et al. |
| 6,832,052 B1 * | 12/2004 | Marmur ..................... 398/175 |
| 6,909,848 B2 | 6/2005 | Kim et al. |
| 6,937,949 B1 | 8/2005 | Fishman et al. |
| 6,941,077 B2 | 9/2005 | Aronson et al. |
| 6,944,404 B2 | 9/2005 | Lange et al. |
| 6,952,531 B2 | 10/2005 | Aronson et al. |
| 6,956,847 B2 | 10/2005 | Heston et al. |
| 6,977,517 B2 | 12/2005 | Miao et al. |
| 7,010,030 B2 | 3/2006 | Vaidyanathan |
| 7,019,548 B2 | 3/2006 | Miao et al. |
| 7,020,567 B2 | 3/2006 | Fishman et al. |
| 7,024,059 B2 | 4/2006 | Kurchuk |
| 7,031,615 B2 | 4/2006 | Gentile |
| 7,058,310 B2 | 6/2006 | Aronson et al. |
| 7,062,164 B2 * | 6/2006 | Ames et al. ................... 398/25 |
| 7,099,382 B2 | 8/2006 | Aronson et al. |
| 7,110,668 B2 | 9/2006 | Gerstel et al. |
| 7,155,127 B2 | 12/2006 | Akimoto et al. |
| 7,245,638 B2 | 7/2007 | Agazzi |
| 7,308,060 B1 * | 12/2007 | Wall et al. .................... 375/355 |
| 7,477,847 B2 | 1/2009 | Hofmeister et al. |
| 2001/0046242 A1 | 11/2001 | Kawakami et al. |
| 2001/0046243 A1 | 11/2001 | Schie |
| 2002/0021468 A1 * | 2/2002 | Kato et al. ................... 359/152 |
| 2002/0027688 A1 | 3/2002 | Stephenson |
| 2002/0034222 A1 | 3/2002 | Buchwald et al. |
| 2002/0060824 A1 * | 5/2002 | Liou et al. ................... 359/152 |
| 2002/0075981 A1 | 6/2002 | Tang et al. |
| 2002/0080447 A1 | 6/2002 | Fells et al. |
| 2002/0097468 A1 | 7/2002 | Mecherle et al. |
| 2002/0097682 A1 | 7/2002 | Enam et al. |
| 2002/0101641 A1 | 8/2002 | Kurchuk |
| 2002/0105982 A1 | 8/2002 | Chin et al. |
| 2002/0110157 A1 | 8/2002 | Jorgenson et al. |
| 2002/0114061 A1 | 8/2002 | Naito et al. |
| 2002/0129379 A1 | 9/2002 | Levinson et al. |
| 2002/0131132 A1 | 9/2002 | Tanaka et al. |
| 2002/0149812 A1 | 10/2002 | Hong et al. |
| 2002/0149821 A1 | 10/2002 | Aronson et al. |
| 2002/0163960 A1 | 11/2002 | Blodgett et al. |
| 2002/0176518 A1 | 11/2002 | Xu |
| 2002/0181519 A1 | 12/2002 | Vilhelmsson et al. |
| 2002/0181573 A1 | 12/2002 | Dohmen et al. |
| 2002/0181894 A1 | 12/2002 | Gilliand et al. |
| 2003/0002108 A1 | 1/2003 | Ames et al. |
| 2003/0011847 A1 | 1/2003 | Dai et al. |
| 2003/0039207 A1 | 2/2003 | Maeda et al. |
| 2003/0053170 A1 | 3/2003 | Levinson et al. |
| 2003/0110509 A1 | 6/2003 | Levinson et al. |
| 2003/0113118 A1 | 6/2003 | Bartur |
| 2003/0169790 A1 | 9/2003 | Chieng et al. |
| 2003/0210917 A1 | 11/2003 | Stewart et al. |
| 2003/0219085 A1 | 11/2003 | Endres et al. |
| 2004/0033079 A1 | 2/2004 | Sheth et al. |
| 2004/0076113 A1 | 4/2004 | Aronson et al. |
| 2004/0076114 A1 | 4/2004 | Miriello |
| 2004/0076119 A1 | 4/2004 | Aronson et al. |
| 2004/0091028 A1 | 5/2004 | Aronson et al. |
| 2004/0120720 A1 | 6/2004 | Chang et al. |
| 2004/0153913 A1 | 8/2004 | Fishman et al. |
| 2004/0202210 A1 | 10/2004 | Thornton |
| 2004/0240886 A1 | 12/2004 | Aronson et al. |

| | | | |
|---|---|---|---|
| 2004/0253003 | A1 | 12/2004 | Farmer et al. |
| 2005/0031352 | A1 | 2/2005 | Light et al. |
| 2005/0058455 | A1 | 3/2005 | Hosking et al. |
| 2005/0111845 | A1 | 5/2005 | Nelson et al. |
| 2005/0169585 | A1 | 8/2005 | Aronson et al. |
| 2005/0213982 | A1 | 9/2005 | Weber |
| 2005/0281193 | A1 | 12/2005 | Hofmeister et al. |
| 2007/0031153 | A1 | 2/2007 | Aronson et al. |

FOREIGN PATENT DOCUMENTS

| | | |
|---|---|---|
| EP | 0437161 | 6/1996 |
| EP | 0745868 | 4/2002 |
| EP | 1503232 | 7/2004 |
| EP | 02704344 | 10/2004 |
| EP | 04017254 | 10/2004 |
| EP | 1471671 | 12/2004 |
| GB | 2406988 | 4/2005 |
| GB | 0600513.6 | 5/2006 |
| GB | 0600513.6 | 11/2006 |
| GB | 0600513.6 | 4/2007 |
| JP | 58140175 | 8/1983 |
| JP | 62124576 | 6/1987 |
| JP | 62235975 | 10/1987 |
| JP | 62281485 | 12/1987 |
| JP | 402102589 | 4/1990 |
| JP | 404023373 | 1/1992 |
| JP | 06209209 | 7/1994 |
| JP | 08-321825 | 3/1996 |
| JP | 09162811 | 6/1997 |
| JP | 11-275016 | 8/1999 |
| KR | 10-2006-7001640 | 12/2006 |
| TW | 224406 | 11/2004 |
| WO | WO 98/00893 | 1/1998 |
| WO | WO 98/00943 | 8/1998 |
| WO | 0203226 | 5/2002 |
| WO | WO 02/063800 | 8/2002 |
| WO | WO/2004/098100 | 11/2004 |
| WO | 2005006575 | 1/2005 |

OTHER PUBLICATIONS

"IR Receiver ASSP: T2525", copyright 2003 by Atmel Corporation.
"IR Receiver for Data Communication: U2538B", copyright 2003 by Atmel Corporation.
"Low-Voltage Highly Selective IR Receiver IC: T2527", copyright 2002 by Atmel Corporation.
Finisar Corp., "App. Note AN-2025: Using the Finisar GBIC I2C Test Diagnostics Port," 1998.
Hausdorf, Reiner, "Mobile Transceiver Measurements with Radiocommunication Service Monitor CMS," News from Rohde & Schwarz, 127, IV, 1989, pp. 4-7.
Kaminishi, K. et al., Si Bipolar 3.3V Transmitter/Receiver IC Chip Set for 1Gb/s 12-Channel Parallel Optical Interconnects, IEEE International Solid-State Circuits Conference, ISSCC, Digest of Technical Papers, 1999 Paper WP 22.1.
Maeda, Noriyuki "Notification of Reason(s) for Refusal," Japanese Patent Application No. JP2002-563630, Nakamura, M. et al., Jul. 13, 2005.
Manchester Encoding [retrieved Nov. 12, 2003 from the Internet] http://www.erg.abdn.ac.uk/users/gorry/course/phy-pages/man.html.
Optiport SFF BiDi-Transceiver 100 Mbit/s, 1310 nm Tx/1550 nm Rx, Infineon Technologies, Jun. 22, 2004, pp. 1-14.
Webopedia.com: 12C [retrieved Nov. 11, 2003 from the Internet] http://www.webopedia.com/TERM/I/12C.html.
Webopedia.com: MAC Address [retrieved Oct. 15, 2003 from the Internet] http://www.webopedia.com/TERM/M/MAC_address.html.
Webopedia.com: Public-Key Encryption [retrieved Oct. 15, 2003 from the Internet] http://www.webopedia.com/TERM/p/public_key_cryptography.html.
Webopedia: The 7 Layers of the OSI Model [retrieved Oct. 15, 2003 from the Internet] http://webopedia.internet.com/quick_ref/OSI_Layers.asp.

Yi Cai et al., "Jitter testing for gigabit serial communication transceivers," Jan.-Feb. 2002, IEEE Design and Test of Computers, vol. 19, Issue 1, pp. 66-74.
U.S. Appl. No. 10/420,027, filed Jan. 25, 2006, Office Action.
U.S. Appl. No. 10/420,027, filed Sep. 7, 2006, Office Action.
U.S. Appl. No. 10/420,027, filed May 16, 2007, Office Action.
U.S. Appl. No. 10/629,725, filed Oct. 17, 2005, Office Action.
U.S. Appl. No. 10/629,725, filed Apr. 11, 2006, Notice of Allowance.
U.S. Appl. No. 10/629,301, filed Aug. 9, 2007, Office Action.
U.S. Appl. No. 10/629,302, filed Jun. 14, 2007, Office Action.
U.S. Appl. No. 10/629,228, filed Jan. 24, 2006, Office Action.
U.S. Appl. No. 10/629,228, filed Sep. 1, 2006, Office Action.
U.S. Appl. No. 10/629,228, filed May 24, 2007, Office Action.
U.S. Appl. No. 10/697,395, filed Jan. 24, 2006, Office Action.
U.S. Appl. No. 10/697,395, filed Sep. 27, 2006, Office Action.
U.S. Appl. No. 10/697,395, filed May 9, 2007, Office Action.
U.S. Appl. No. 10/697,395, filed Nov. 15, 2007, Office Action.
U.S. Appl. No. 10/884,334, filed Jun. 12, 2007, Office Action.
LXT16706/16707 SerDes Chipset, Intel Products, www.intel.com/design/network/products/optical/phys/lxt16706.htm, Feb. 10, 2004.
LXT35401 XAUI-to-Quad 3.2G Transceiver, Intel Products, www.intel.com/design/network/products/optical/phys/1xt35401.htm, Apr. 19, 2002.
Texas Instruments User's Guide, TLK2201 Serdes EVM Kit Setup and Usage, Mixed Signal DSP Solutions, Jul. 2000.
Texas Instruments User's Guide, TLK1501 Serdes EVM Kit Setup and Usage, Mixed Signal Products, Jun. 2000.
National Semiconductor DS92LV16 Design Guide, Serializing Made Simple, www.national.com/lvds, Feb. 2002.
Vaishali Semiconductor, Fibre Channel Transceiver, VN16117, MDSN-0002-02, Aug. 9, 2001, pp. 1-15.
Fairchild Semiconductor, Application Note 77, CMOS, the Ideal Logic Family, Jan. 1983.
Analog Target Specification, Annex 48B, Published by IEEE New York, May 2001, pp. 6-14.
XFP MSA Group, Ultra Small, 10-Gigabit Module Slashes Cost, Power and Footprint of Telecommunications and Datacommunications Equipment, Press Release, Irvine, California, Mar. 4, 2002. [World Wide Web page]. Available: www.xfpmsa.org/cgi-bin/pressrelease1.cgi.
XFP MSA Group New Module to Slash Cost, Power and Size of Telecommunications and Data Communications Equipment, Press Release, Costa Mesa, California, Jul. 22, 2002. [World Wide Web page]. Available: www.xfpmsa.org/cgi-bin/pressrelease3.cgi.
Finisar XFP Achieves 300 m Transmission on Legacy Multlimode Fiber, Finisar News Release, Sunnyvale, California, Sep. 17, 2003. [World Wide Web page]. Available: http://investor.finisar.com/ReleaseDetail.
XFP MSA Group, About the 10 Gigabit Small Form Factor Pluggable (XFP) Multi Source Agreement (MSA) Group. Feb. 11, 2004. [World Wide Web page]. Available: www.xfpmsa.org/cgi-bin/home.cgi.
Michael Green, Andrew A. Shapiro, Armond Hairapetian CommsDesign An EE Times Community "Mixing it up with OC-192 CMOS Transceivers", 8 pages May 3, 2006 http://www.commsdesign.com/main/2000/12/0012feat6.htm.
Dallas Maxim "HFTA-01.0: 2.5Gbps SDH/SONET Fiber Optic Chipset", 4 pages Oct. 10, 2000 http://www.maxim-ic.com/appnotes.cfm/appnote_number/713/ln/en.
Dallas Maxim "MAX3872 Multirate Clock and Data Recovery with Limiting Amplifier", 2 pages Mar. 30, 2003 http://www.maxim-ic.com/quick_view2.cfm/qv_pk/3705.
Huiqing Zhong and Stephen I. Long "Monothic Clock and Data Recovery Chip for 10GB/S Fiber Communications Systems", 4 pages 1997-98.
GIGA an Intel Company "2.5 Gbit/s Clock and Data Recovery GD16546B" 9 pages Jul. 31, 2001.
U.S. Appl. No. 10/629,301, filed Jul. 28, 2003, Aronson et al.
U.S. Appl. No. 10/697,395, filed Oct. 30, 2003, Hofmeister et al.
A. Ghiasi, "'XFP' The Module Based 10Gig Universal Serial Interconnect 'XFI'", presentation material, Apr. 8, 2002.
U.S. Appl. No. 10/626,965, filed Aug. 7, 2006, Office Action.
U.S. Appl. No. 10/626,965, filed Jan. 24, 2007, Office Action.
U.S. Appl. No. 10/626,965, filed Aug. 9, 2007, Office Action.

U.S. Appl. No. 10/420,027, filed Dec. 12, 2007, Office Action.
U.S. Appl. No. 11/073,452, filed Dec. 31, 2007, Office Action.
U.S. Appl. No. 10/629,228, filed Jan. 3, 2008, Office Action.
U.S. Appl. No. 10/626,965, filed Mar. 18, 2008, Office Action.
U.S. Appl. No. 10/629,301, filed Apr. 1, 2008, Office Action.
U.S. Appl. No. 10/629,302, filed May 2, 2008, Final Office Action.
U.S. Appl. No. 10/697,395, filed May 30, 2008, Notice of Allowance.
U.S. Appl. No. 10/420,027, filed Jun. 25, 2008, Notice of Allowance.
Hawthorne: "850nm Proton VCSEL Reliability Study" Technical Publications and Application Notes, Advances Optical Components (Finisar Corp), Issue 2, Sep. 2001, pp. 1-7, Richardson, TX.
Mecherle G S et al: "Considerations for Accelerated Laser Diode Life Testing" Proceedings of the Spie, Bellingham, VA, vol. 717, 1986, pp. 53-62.
Tebbi O et al: "Comparitive study of acclerated testing models, applications in mechanics" 2001 IEEE International Conference on Systems Man and Cybernetics SMC 2001. Tucson, AZ Oct. 7-10, 2001, IEEE International Conference on Systems, Man and Cybernetics, New York, NY: IEEE, US, vol. 1 of 5 Oct. 7, 2001 pp. 2099-2104.
J.D. Barry et al.: Thermally Accelerated Life Testing of Single Mode, Double-Heterostructure, AlGaAs Laser Diodes Operated Pulsed at 50 mW Peak Power IEEE Journal of Quantum Electronics, vol. 21, No. 4 Dec. 25, 1984 pp. 365-376.
U.S. Appl. No. 10/629,302, filed Jan. 25, 2008, Office Action.
U.S. Appl. No. 10/629,301, filed Apr. 1, 2008, Office Action.
U.S. Appl. No. 11/073,452, filed Aug. 7, 2008, Office Action.
U.S. Appl. No. 11/073,452, filed Dec. 31, 2007, Office Action.
U.S. Appl. No. 10/629,302, filed May 2, 2008, Office Action.
U.S. Appl. No. 10/884,334, filed Jan. 16, 2009, Office Action.
U.S. Appl. No. 10/884,334, filed Jul. 10, 2008, Office Action.
U.S. Appl. No. 10/629,301, filed Nov. 26, 2008, Office Action.
U.S. Appl. No. 10/629,302, filed Nov. 17, 2008, Office Action.
U.S. Appl. No. 10/626,965, filed Jan. 24, 2007, Office Action.
U.S. Appl. No. 10/626,965, filed Aug. 9, 2007, Office Action.
U.S. Appl. No. 10/420,027, filed Dec. 12, 2007, Office Action.
U.S. Appl. No. 10/629,228, filed Jan. 3, 2008, Office Action.
U.S. Appl. No. 10/626,965, filed Mar. 18, 2008, Office Action.
U.S. Appl. No. 10/697,395, filed May 30, 2008, Office Action.
U.S. Appl. No. 10/420,027, filed Jun. 25, 2008, Office Action.
U.S. Appl. No. 10/884,334, filed Jan. 31, 2008, Office Action.

* cited by examiner

US 7,561,855 B2

TRANSCEIVER MODULE AND INTEGRATED CIRCUIT WITH CLOCK AND DATA RECOVERY CLOCK DIPLEXING

CROSS-REFERENCE TO RELATED APPLICATIONS

This application is a continuation in part of U.S. patent application Ser. No. 10/629,301, "Transceiver Module and Integrated Circuit With Multi-Rate Eye Openers and Bypass", filed Jul. 28, 2003, which is a divisional of U.S. patent application Ser. No. 10/420,027, "Transceiver Module and Integrated Circuit With Dual Eye Openers," filed Apr. 17, 2003, now U.S. Pat. No. 7,486,894 which claims the benefit of U.S. Provisional Patent Application Ser. No. 60/410,509, filed Sep. 13, 2002 and which also claims the benefit of U.S. Provisional Patent Application Ser. No. 60/391,877, filed Jun. 25, 2002. The foregoing patent applications are incorporated herein by reference in their entirety.

BACKGROUND OF THE INVENTION

1. The Field of the Invention

The present invention relates generally to ensuring data integrity within a networking box, and more particularly, to on-chip clock and data recovery in a transceiver module.

2. Background of the Invention

The proliferation and significance of networking technology is well known. The ever-increasing demand for network bandwidth has resulted in the development of technology that increases the amount of data traveling across a network. Advancements in modulation techniques, coding algorithms and error correction have drastically increased rates of this data. For example, a few years ago, the highest rate that data could travel across a network was at approximately one Gigabit per second (Gb/s). This rate has increased ten-fold today where data travels across Ethernet and SONET (Synchronous Optical Network) networks at upwards of 10 Gb/s. For instance, the XFP (10 Gb/s serial electrical interface) Pluggable Module Multi-Source Agreement is directed at transceivers operating at approximately 10 Gb/s.

FIG. 1 illustrates some of the shortcomings of a transceiver module 100 commonly used in prior art networking devices. The transceiver module 100 is coupled to a network via interfaces 130, 135 and to a host device 105 such as a media access controller ('MAC') card or SONET framer. The transceiver module 100 has a receiver 115 that is coupled to network interface 130 and a first serializer/deserializer ('SERDES') 110. The first SERDES 110 is coupled to the host 105 via a parallel bus 140. An example of this parallel bus 140 may be a (XAUI) 10-Gigabit Attachment Unit Interface that has four 3.125 Gb/s channels that transfer an aggregate 10 Gb/s data stream between the transceiver module 100 and the host 105. The transceiver module 100 also has a transmitter 125 that is coupled to network interface 135 and a second SERDES 120. The second SERDES 120 is coupled to the host 105 via a second parallel bus 145 such as the XAUI described above.

In operation, a serial optical data stream received by the transceiver module 100 is converted to an electrical serial data stream by the receiver 115. This electrical serial data stream is deserialized by the SERDES 110 into four channels and transmitted via the parallel bus 140 to the host 105 for processing. This deserialization occurs in order to prevent further bandwidth degradation of the electrical data stream and stay below a jitter budget as it continues to travel along the data path. A high data rate electrical signal (e.g., 10 Gb/s) is more easily distorted by imperfections within the data path and by the inductance of the bus and connections along the data path. Reflections caused by discontinuities within a transmission line and amplitude degradations caused by nodes within a path (e.g., wire bond, solder bump, etc.) may significantly increase errors within the signal and increase jitter beyond an acceptable threshold or budget. Additionally, inductance is proportionally more severe at higher frequencies. Thus, the data stream is deserialized onto parallel transmission lines in order to reduce the rate on each of these lines and minimize degradation along the data path.

A similar deserialization occurs on the transmit side of the transceiver module 100 for the same reasons described above. In particular, a deserialized electrical data stream is transferred from the host 105 to the second SERDES 120 via parallel bus 145. The second SERDES 120 serializes this electrical signal. The transmitter 125 converts the serial electrical signal to an optical signal and transmits it onto the network.

One drawback of module 100 is that the SERDES 110, 120 and the interfaces to the parallel buses 140, 145 require a relatively large amount of space on the transceiver module 100. Additionally, SERDES consume power and release a relatively large amount of heat. Another drawback of module 100 is that conventional transceiver modules do not include convenient, cost-effective means to monitor the status of data paths and confirm proper operation of the transceiver.

Fiberoptic modules operating at data rates less than 10 Gb/s commonly employ serial electrical interfaces without any means of resetting the jitter budget at the inputs and outputs of the module 100. The most common data rates for these modules are at 1.0625 Gb/s for Fibre Channel, 1.25 Gb/s for Gigabit Ethernet, 2.125 Gb/s for double-rate Fibre Channel, 2.48 Gb/s for OC-48, 2.7 Gb/s for forward error correction ('FEC') rates of OC-48, and numerous rates less than 1 Gb/s for other applications. Serial modules are also used for proprietary links at data rates from less than 1 Gb/s to about 3.125 Gb/s. At these relatively low data rates, there is no need to perform reshaping or retiming of the data at the electrical inputs and outputs ('I/Os') of the module because the signal degradations at those data rates are sufficiently small. However, at data rates approaching or exceeding 10 Gb/s, the bit periods become sufficiently short so that signal degradations are difficult to minimize using conventional approaches to serial modules. Additionally, serial modules at data rates lower than 10 Gb/s can have digital or analog monitoring functions, but the types of error monitoring or diagnostic features that are possible in a module incorporating an integrated SERDES have not thus far implemented.

Moreover, the XFP standard requires that transceiver modules handle data rates of approximately 10 Gb/s, while outputting to the host through a serial interface among other things. Particularly, an XFI (10 Gb/s serial electrical interface) is designed for serial input from an XFP transceiver. This allows host designers and manufacturers to supply host systems assuming that XFP transceivers will perform the discussed functions.

Therefore, it is desirable to provide a transceiver module capable of handling 10 Gb/s data input from a network within a jitter budget. It is further desirable to provide a transceiver module that interfaces with a host using serial connections, thereby allowing the removal of SERDES components from the module. Additionally, it is desirable to provide additional functionality, for example error monitoring functionality that is integrated within the transceiver module that would identify errors and perform bit error rate tests ('BERTs') within a data path and/or component on the module.

BRIEF SUMMARY OF THE INVENTION

One embodiment includes an integrated circuit. The integrated circuit is usable in a transceiver module. The integrated circuit includes an input port that is configured to receive a data stream. A clock port on the integrated circuit is configured to receive a reference clock diplexed with another signal or voltage used by the integrated circuit. An eye opening circuit is connected to the input port and clock. The eye opening circuit is configured to retime the data stream received at the input port. An output port is connected to the eye opening circuit. The output port is configured to transmit a retimed signal from the eye opening circuit to a device external to the integrated circuit. A bypass circuit is connected to the input port and the output port. The bypass circuit may selectively bypass the eye opening circuit.

Another embodiment includes a method of handling data. The method includes receiving a data stream. A clock stream is also received where the clock signal has -been diplexed with another signal or voltage. The method includes selectively retiming the data stream by using the clock signal or alternatively bypassing retiming the data stream. The method further includes transmitting the retimed or bypassed data stream.

Another embodiment includes functional elements designed to accomplish data handling. This embodiment includes a means for receiving a data stream. The embodiment further includes a means for receiving a clock signal that has been diplexed with another signal or voltage. Also included is a means for selectively retiming the data stream using the clock signal or bypassing retiming the data stream. Further, the embodiment includes a means for transmitting the retimed or bypassed data stream.

Advantageously, some embodiments allow for integrated circuits which ordinarily would not allow for clock signals to accommodate clock signals for retiming and eye opening functionality. This allows for retiming circuits to be used to reduce bit errors on high speed communications circuits.

These and other advantages and features of the present invention will become more fully apparent from the following description and appended claims, or may be learned by the practice of the invention as set forth hereinafter.

DETAILED DESCRIPTION OF THE PREFERRED EMBODIMENTS

An apparatus and method for providing serial connections between a transceiver module and host is described. In particular, clock and data recovery and error monitoring functionality is integrated on the transceiver module that allows these serial connections. One skilled in the art will recognize that embodiments of the present invention and description below may also be incorporated within a transponder module. In the following description, for purposes of explanation, specific details are set forth in order to provide an understanding of the invention. It will be apparent, however, to one skilled in the art that the invention can be practiced without these details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
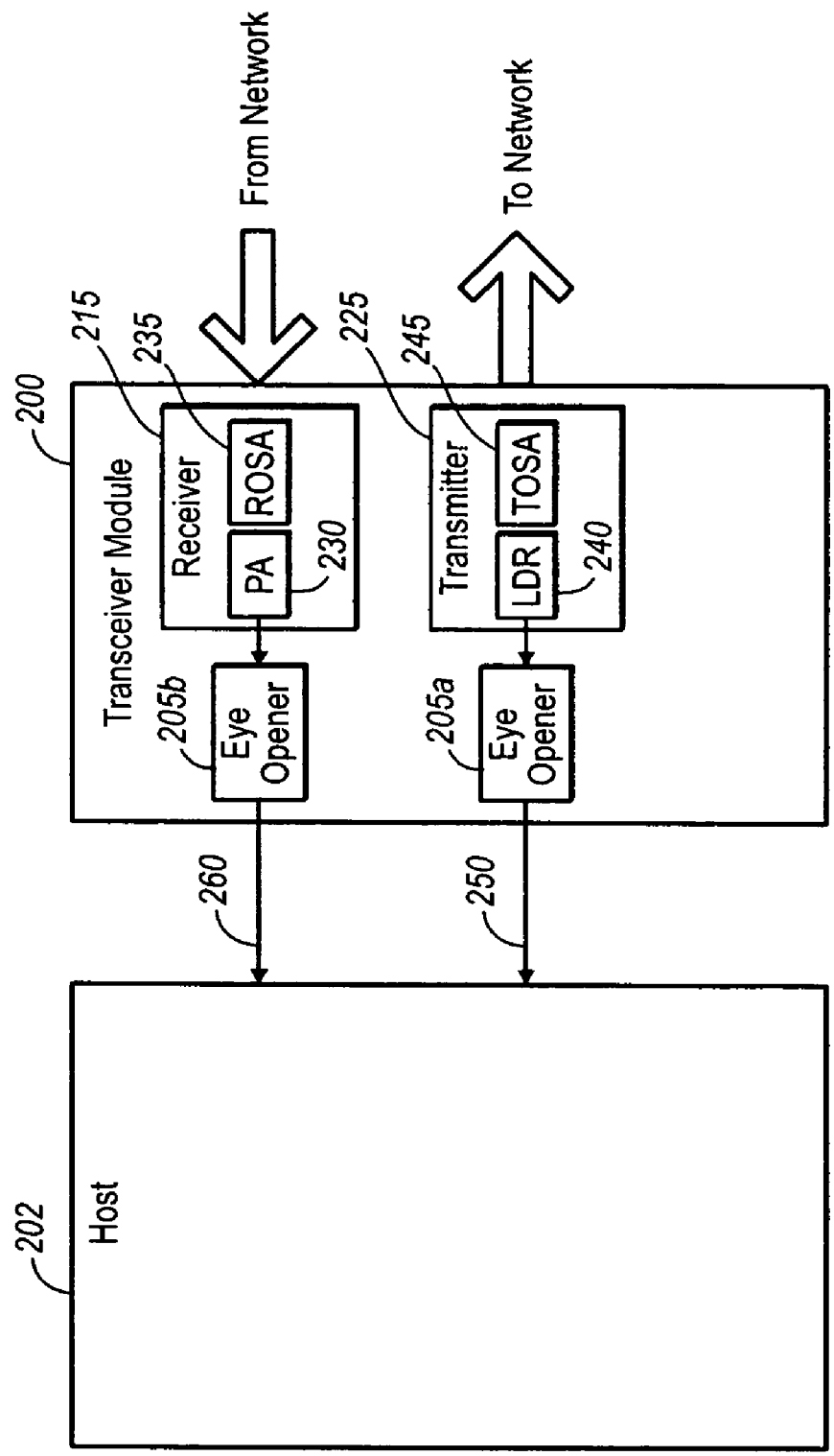
FIG. 2 is an illustration of a system including a transceiver module (e.g., an XFP 10 Gb/s module) comprised of dual eye openers and having a serial connection to a host according to an embodiment of the present invention.

FIG. 2 is an illustration of a system including a transceiver module 200 (e.g., an XFP 10 Gb/s module) comprised of dual eye openers 205a, 205b and having a serial connection 250, 260 to a host according to an embodiment of the present invention. The receive path includes a receiver 215 coupled to a network and an eye opener 205b. The eye opener 205b is designed to clean up high frequency jitter, i.e., "open" the eye diagram of serial data streams for optical transceivers. The receiver 215 includes a receiver optical sub-assembly ('ROSA') 235 that receives and converts an optical signal to an electrical signal. The receiver 215 also includes a post-amplifier 230 that amplifies the electrical signal to an appropriate power level. One skilled in the art will recognize that the eye opener 205b and ROSA 235 may be manufactured and packaged using multiple methods. For example, the eye opener 205b and ROSA 235 may be integrated within a single ASIC or manufactured separately.

The receiver eye opener 205b extracts a clock from the electrical signal and uses that recovered clock to regenerate degraded data within the signal. In particular, the receiver eye opener 205b provides retiming and reshaping that removes jitter (i.e., resets the jitter budget in the link). The retiming and reshaping function of the eye opener 205 may be implemented by a clock and data recovery ('CDR') and a retimer ('RT'), a signal conditioner, or any device capable of opening the eye diagram. Both passive and adaptive equalization circuits may be used for these purposes. The eye opener 205b is preferably responsive to the data rate of the data stream on the particular path. According to one embodiment, the receiver eye opener 205b includes a phase locked loop that aligns the phase of the electrical signal with a reference clock to ensure that the electrical signal is correctly clocked, and a signal shaper that filters noise from the signal and more accurately shapes the pulse edges in the signal. The eye openers 205a, 205b may be implemented as ASICS, as a configurable circuit such as an FPGA, or partly in software, to name but a few possibilities. One skilled in the art will recognize that there are numerous methods for providing eye opening functionality that operate in accordance with the present invention. After the electrical signal has been properly synchronized and shaped by the receiver eye opener 205b, it is transmitted to the host 202 via a serial path 260 such as an XFI-compliant 10 Gb/s transmission line.

Other advantageous functions may also be implemented herein along with the eye openers 205a, 205b. In some embodiments, bypass, also known as "pass-through", functions are incorporated in the eye openers 205a, 205b which allow the data to bypass the retiming and reshaping functions of the eye opener. These bypass functions can be automatically selected, for instance by use of a loss of lock ('LOL') signal, or selectable with a control line or digital control. The eye openers 205a, 205b may also have low power modes (power down modes) that are enabled via a control pin, or by control through a digital bus or two wire interface. The eye openers 205a, 205b may also have BERT functions whereby a BERT engine within the eye opener generates data and/or an error detector matches up incoming data to a predetermined pattern to check for errors in the data stream. In addition, the eye openers 205a, 205b may have loopback functions that allow the data to be looped back with the addition of some signal I/Os between the eye opener 205a, 205b. For instance, data from eye opener 205b may be routed over to eye opener 205a and this data transmitted to the transmitter 225 in place of the data from data path 250. In some combinations, these features allow the transceiver to perform self-test, or diagnostics of the data link, or diagnostics of the host system. These functionalities will be discussed in more detail below.

The transmit path includes a transmitter 225 coupled to a network and a transmitter eye opener 205a. The transmitter eye opener 205a recovers degraded clock and data values from an electrical signal that travels from the host 202 via data path 250 (e.g., 10 G/s transmission line). As described above, the electrical signal will degrade along this path 250 and the eye opener 205a compensates for this degradation and sends the electrical signal to the transmitter 225. The transmitter 225 includes a transmitter optical sub-assembly ('TOSA') 245 that converts an electrical signal to an optical signal and transmits it onto a network. The transmitter 225 also preferably includes a laser driver 240 that controls a laser within the TOSA 245 and the modulation of data within the electrical signal onto the optical signal. The laser within the TOSA 245 is also biased to the proper operating current using a dedicated biasing and control circuit that may be contained within or outside of the laser driver 240. The transmitter 225 may include eye opener 205a depending on the particulars of the packaging and design chosen.

This transceiver module 200 allows the data paths 250, 260 to be serial connectors between the transceiver module 200 and the host 202. In particular, the receiver and transmitter eye openers 205a, 205b compensate, for signal degradation that occurs on these serial connections at high data rates, such as a data rate of about 10 Gb/s or higher.

Figure 3:
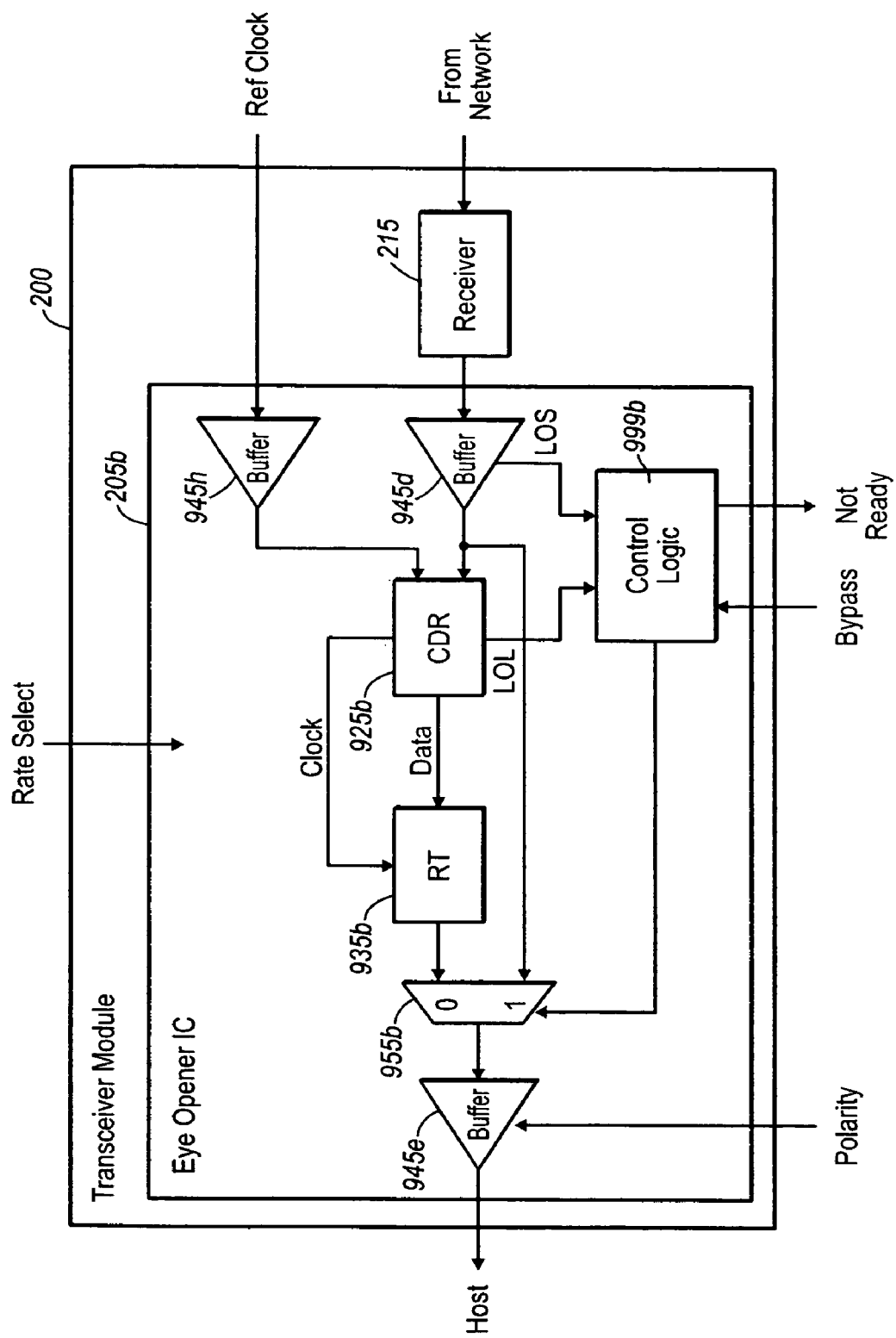
FIG. 3 is an example of an Integrated Circuit (IC) for providing eye opening functionality to a receiver data path with a serial connection to a host.

FIG. 3 is an example of an integrated circuit ('IC') for providing eye opening functionality to a receiver data path with a serial connection to a host. The eye opener IC 205b includes a CDR 925b and an RT 935b. An input of the CDR 925b receives a data stream from an output of a buffer 945d and a reference clock signal from an output of a buffer 945h. A buffer 945d, receives the data path from the network through a receiver 215. A buffer 945h, receives the reference clock signal from the host. The CDR 925b uses the reference clock as a starting point in recovering the data and clock signal from the data path. A clock multiplier unit may be used to adjust the rate of the reference clock as indicated by a rate select pin. The RT 935b is configured to retime and reshape the data stream. A first input of RT 935b receives the data from a first output of the CDR 925b and a second input of the RT 935b receives the recovered clock signal from a second output of the CDR. 925b.

The eye opener IC 205b provides a not ready signal to the host. One condition that activates the not ready signal is a result of a loss of signal ('LOS') signal. A first input of control logic 999b receives the LOS signal from an output of the buffer 945d when the buffer 945d does not detect incoming data. Another condition that activates the not ready signal is a LOL signal. A second input of the control logic 999b receives the LOL signal from an output of CDR 925b when the CDR 925b is not able to lock onto the signal such as when the data rate is outside of the CDR 925b's range. The control logic 999b may, for example, be implemented using OR gate or other appropriate logic.

A MUX 955b provides bypass functionality to the data path. The output of buffer 945d is coupled to a first input of the MUX 955b. A second input of the MUX 955b is the retimed and reshaped data output of RT 935*b*. The control logic 999*b* sends a control signal to the selector input of the MUX 955*b* to select either the first or second input. The control logic 999*b* selects the buffered data from buffer 945*d* in response to receiving a LOL, an LOS, or bypass signal (e.g., from the host). In this embodiment, the control logic 999*b* selects the output RT 935*b* as a default condition.

A polarity control coupled to the input of the buffer 945 exchanges the polarity of its output signal, which is preferably composed of differential signaling. Also, the buffer 945*d* is preferably a coupled mode logic buffer and the buffer 945*h* is preferably a positive emitter coupled logic buffer.

Figure 4:
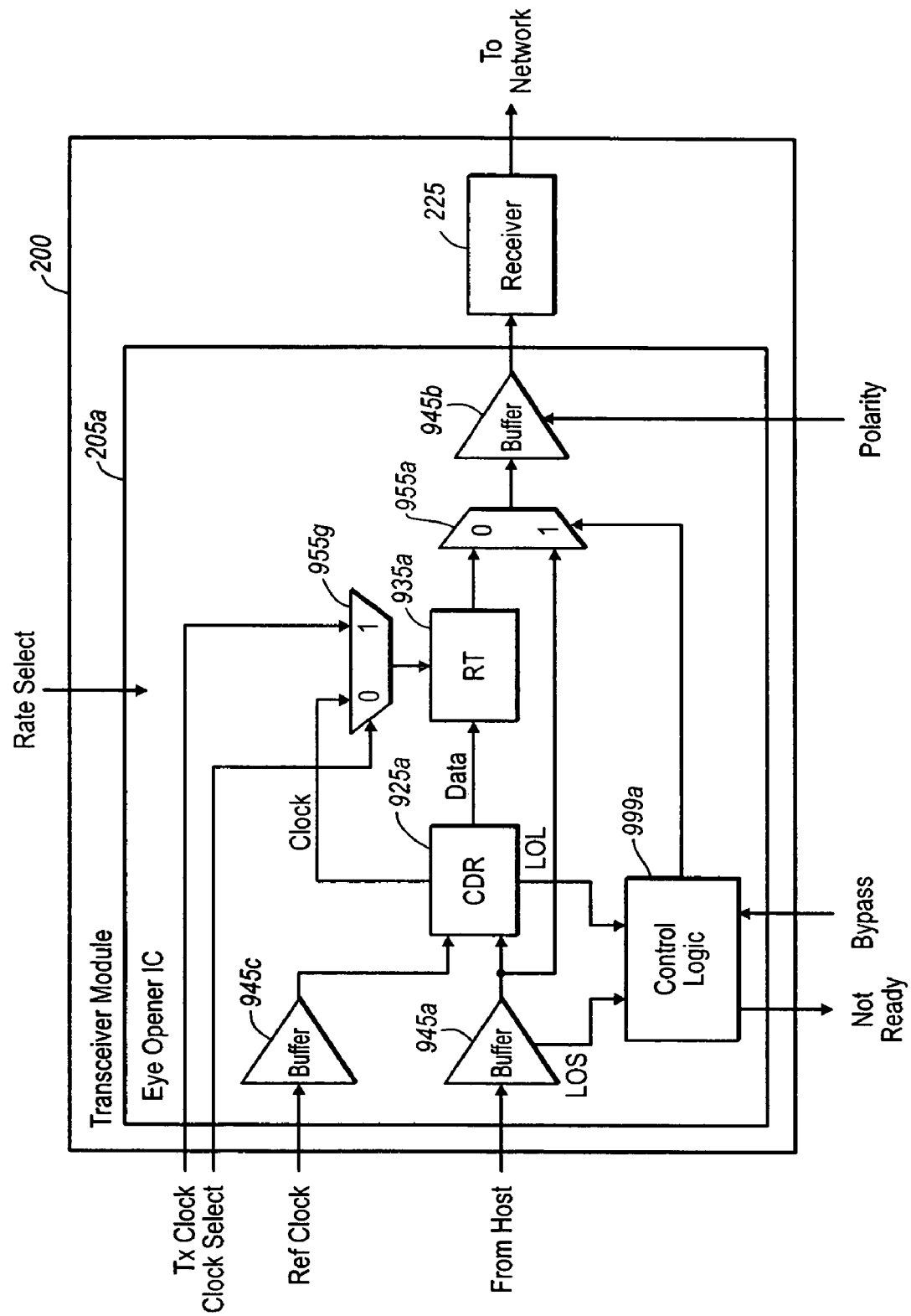
FIG. 4 is an example of an IC for providing eye opening functionality to a transmitter data path with a serial connection to a host.

FIG. 4 is an example of an IC for providing eye opening functionality to a transmitter data path with a serial connection to a host. The eye opener IC 205*a* includes a CDR 925*a* and an RT 935*a*, each operating as described with respect to FIG. 3 except that the data flow is received from the host through a transmitter 225 and sent to the network. An input of the CDR 925*a* receives a data path from an output of a buffer 945*a* and a reference clock signal from an output of a buffer 945*c*. It will be understood that other components of the IC eye opener 205*b* may also be included in the eye opener IC 205*a*.

The eye opener IC 205*a* includes control logic 999*a* to implement the not ready signal. A MUX 955*a* implements the bypass functionality.

A MUX 955*g* allows the retimer 935*a* to retime the data in synchronization with a Tx clock provided, in one example, by the host. A first input of the M-JX 955*g* receives a ref clock signal for use by the RT 935*a* as a starting point in retiming the data. A second input of the MUX 955*g* receives a Tx clock signal, which is preferably a high-quality signal that may be used for retiming, the data in place of the recovered clock signal. The Tx clock frequency may be adjusted by a clock multiplier unit as indicated by a rate select pin. The MUX 955*g* selects between the ref clock signal and the Tx clock signal according to a clock select signal. In one embodiment, the clock select signal is transmitted over a serial line along with other signals instead of through a dedicated pin.

Figure 1:
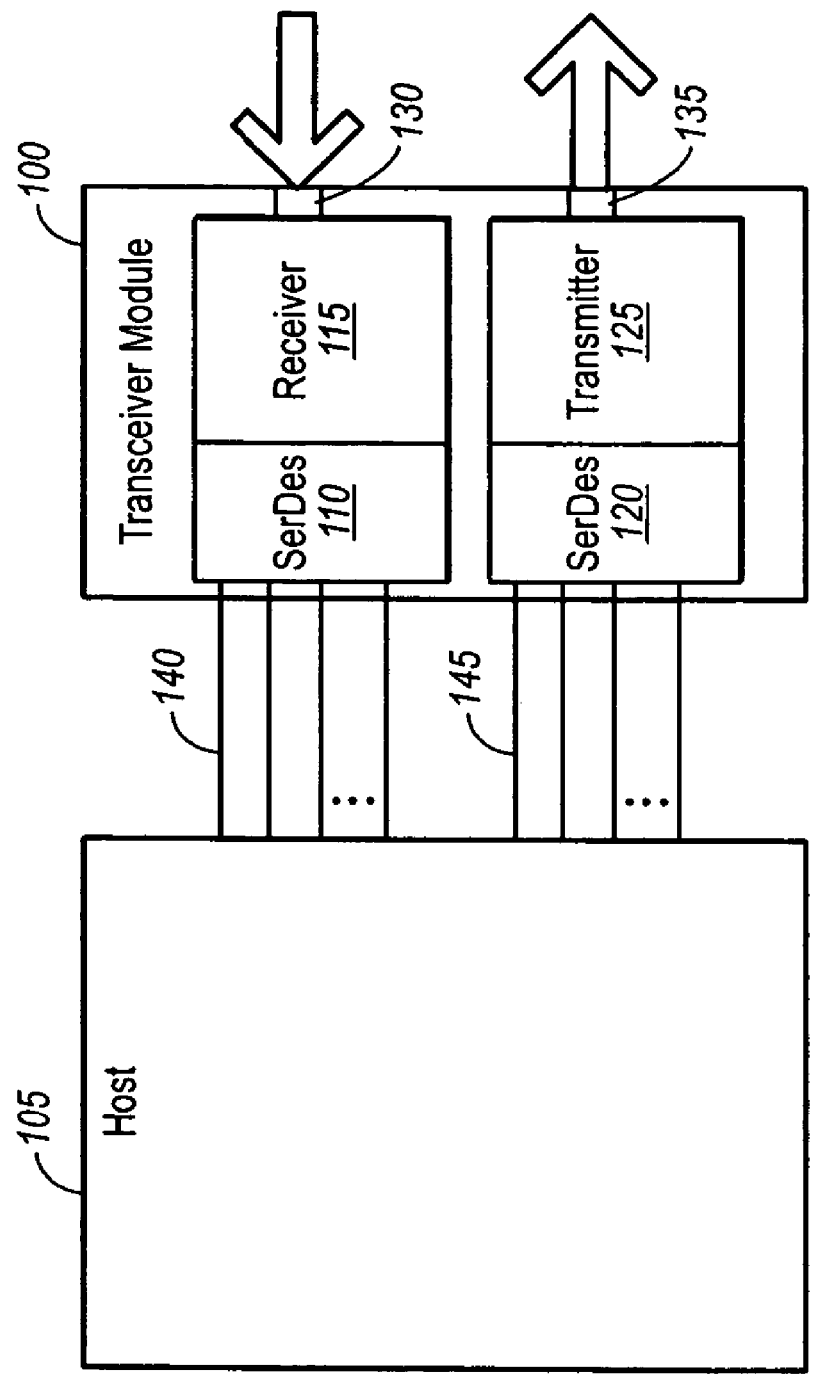
FIG. 1 is an illustration of a prior art transceiver module having a parallel connection to a host.
Figure 5:
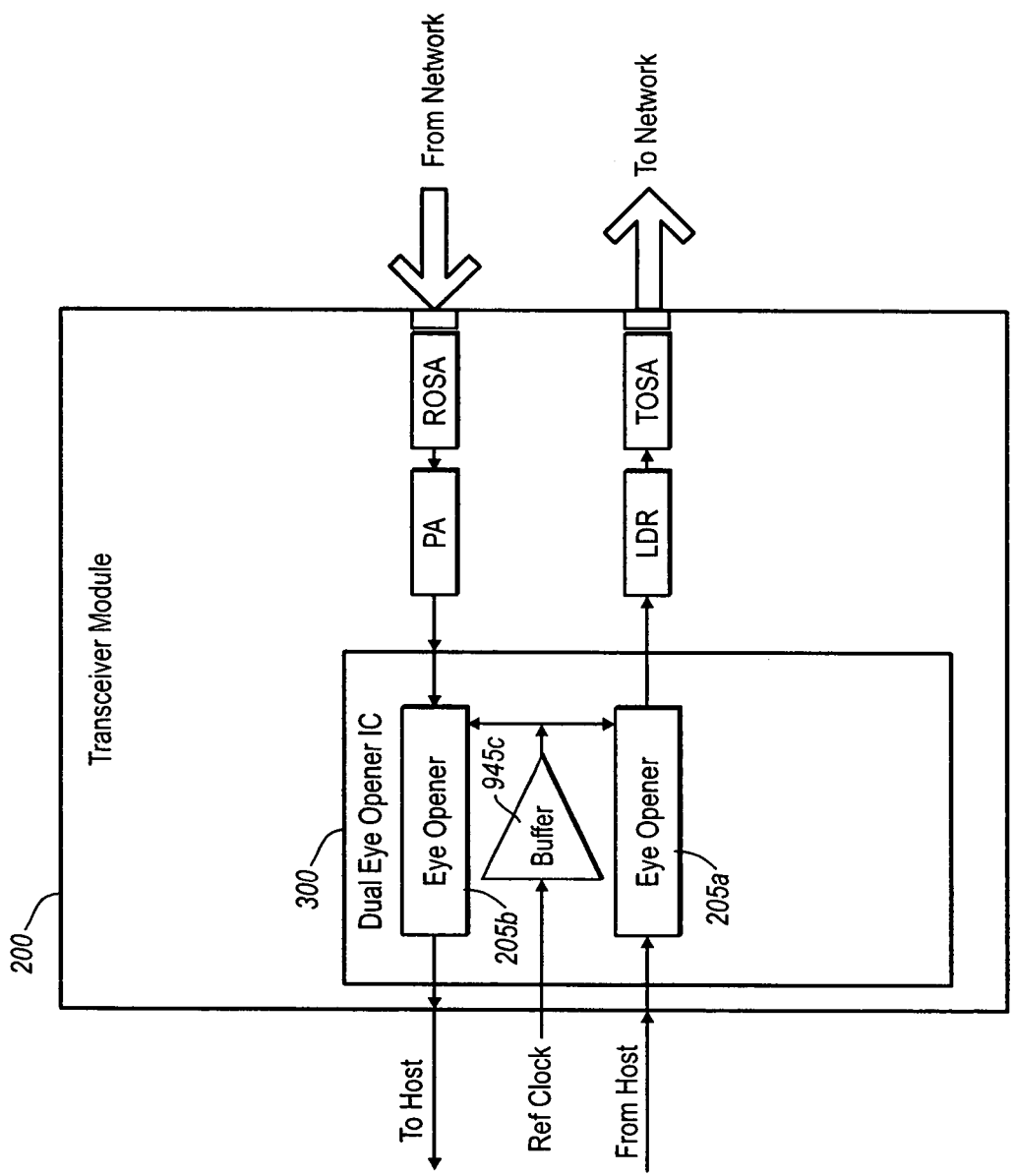
FIG. 5 is an illustration of a transceiver module having dual eye openers integrated on a single chip according to an embodiment of the present invention.

FIG. 5 is an illustration of a transceiver module having dual eye openers integrated on a single chip according to an embodiment of the present invention. This integration allows a smaller aggregate board space to be used, in part, because the eye openers 205*a*, 205*b* replace the relatively larger, more power hungry SERDES 110, 120 (FIG. 1) on the transceiver module. In some embodiments, the SERDES 110, 120 (FIG. 1) that may be included on the host. Also, a higher density of transceivers can be placed in a line card. Furthermore, the packaging is simpler, and provided at a lower cost.

In addition, the receiver eye opener 205*b* and the transmitter eye opener 205*a* can share the single reference clock. Accordingly, this integration reduces the number of inputs or pins on the chip itself, allows for easier testing of the chip, and reduces the number of components. The reference clock is usually an input from the host board and is a clock at a sub-harmonic of the data rate. While it is possible to maintain the clock at exactly the data rate, this may not be desirable for signal integrity and EMI reasons. Generally the reference clock is ¹⁄₁₆th or ¹⁄₆₄th of the data rate. In some operating modes of the transceiver it would be possible to use the recovered clock from the receiver eye opener 205*b* as the reference clock of the transmitter eye opener 205*a*. Alternately, the reference clock input to eye opener 205*b* can be internally rerouted to act as the reference clock for the receiver eye opener 205*b*. In either case, a reference clock is still supplied by the host board.

In other embodiments., the receiver 215 (FIG. 3), the transmitter 225 (FIG. 4), or portions thereof (e.g. post-amplifier or laser driver) may be integrated onto the chip as described below.

Figure 6:
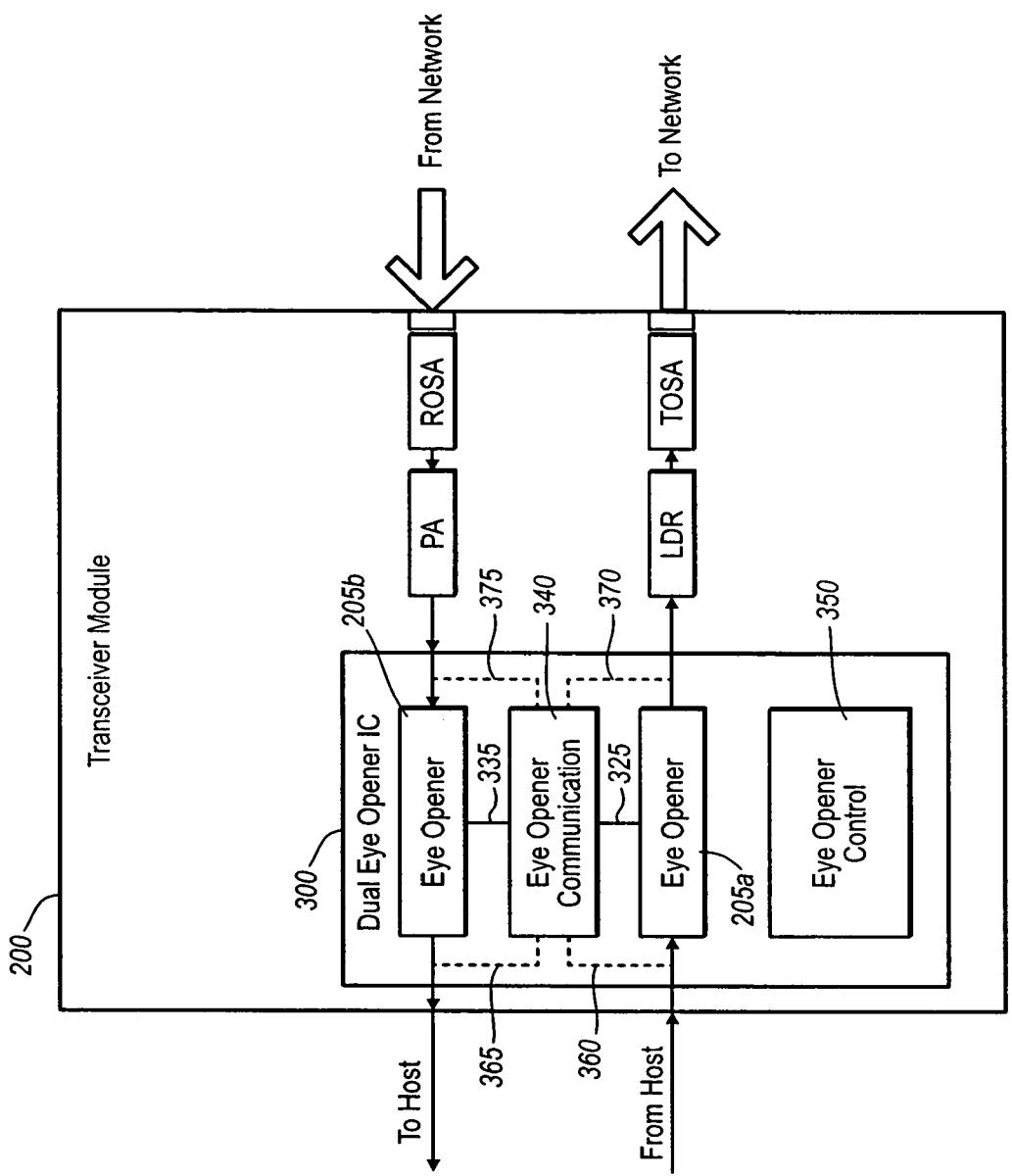
FIG. 6 is an illustration of a transceiver module having a communications path integrated with dual eye openers according to an embodiment of the present invention.

FIG. 6 is an illustration of a transceiver module having a communications path integrated with dual eye openers according to an embodiment of the present invention. In particular, the chip may include an eye opener control module 350 that controls both the receiver eye opener 205*b* and the transmitter eye opener 205*a*. The eye opener control module 350 may be accessed and controlled by a user through a parallel connection, or a serial connection that is discussed below. Additionally, an eye opener communication module 340 may be integrated on an IC 300 to facilitate intelligent communication between the receiver eye opener 205*b* and the transmitter eye opener 205*a*. For example, the eye opener communication module 340 may have direct connections to the receiver eye opener 205*b* and transmitter eye opener 205*a* enabling intelligent analysis and coordination between the two eye openers 205*a*, 205*b*. In another embodiment, the eye opener communication module 340 may have connections 360, 365, 370, 375 that allow it to tap data in front of and behind the receiver and transmitter eye opener. The embodiment would allow the eye opener communication module 340 to monitor both eye openers 205*a*, 205*b* to detect a failing eye opener, and perform diagnostic tests in which data flow is altered to test an individual eye opener or data link.

Figure 7:
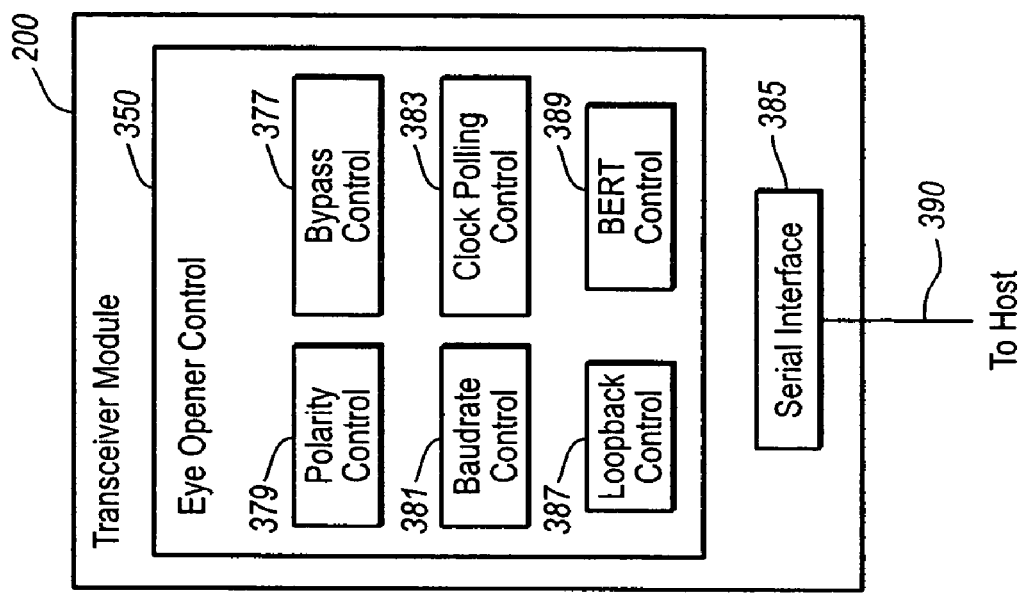
FIG. 7 is an illustration of a control module having a serial interface in a transceiver module having dual eye openers according to an embodiment of the present invention.

FIG. 7 is an illustration of a control module 350 having a serial interface 385 in a transceiver module having dual eye openers according to an embodiment of the present invention. According to this embodiment, the eye opener control module 350 comprises a polarity control 379, a bypass control 377, a baudrate control 381, a clock polling control 383, a loopback control 387, a BERT control 389, and a serial interface 385. A clock polling control 383 allows the eye opener control module 350 to poll the clocking frequency on the receiver eye opener 205*b* (FIG. 6) and the transmitter eye opener 205*a* (FIG. 6). A polarity control 379 allows the eye opener control module 350 to selectably control the input/output data polarity on the receiver eye opener 205*b* (FIG. 6) and the transmitter eye opener 205*a* (FIG. 6). A baudrate control 381 allows the eye opener control module 350 to adjust the baudrate response of the receiver eye opener 205*b* (FIG. 6) and the transmitter eye opener 205*a* (FIG. 6).

A pass-through control 377 allows the eye opener control module 350 to activate/deactivate the receiver eye opener 205*b* (FIG. 6) and the transmitter eye opener 205*a* (FIG. 6) to allow data streams that are incompatible with a data rate range of a particular eye opener to pass through the transceiver module 200. For example, if an eye opener is designed to retime a data stream of about 10 Gb/s, the bypass control 377 may automatically pass-through a 1 Gb/s data stream. Alternatively, the bypass control 377 may be manually controlled allowing a host 202 or network operator to determine whether to pass-through a particular data stream. A loopback control 387 allows the eye opener control module 350 to monitor the integrity of data paths and components on module 200. The BERT control 389 allows the eye opener control module 350 to test bit error rates of data paths and components on module 200. In other embodiments, additional controls to chip functions may be added to the eye opener control 350 such as an adaptive equalizer control.

In one embodiment, a serial interface 385 allows a serial connection 390 to communicate with the eye opener control module 350. In general, a serial connection such as SPI, I2C, RS232, etc. may be used to control functions of the dual eye opener integrated circuit 300 (FIG. 6). Other embodiments of serial connections are disclosed in U.S. patent application Ser. No. 10/266,870, "Optical Transceiver Module with Multipurpose Internal Serial Bus," by-Lewis B. Aronson et al., filed Oct. 8, 2002, which is incorporated by reference herein. Accordingly, the number of pins required to command the eye opener control module 350 is reduced to a single pin. For example, this serial interface 385 replaces four pins in a four rate configuration or two pins in a binary rate configuration. In yet another embodiment, a second serial interface (not pictured) may provide output to the host such as current polarity setting, a LOL signal, current baudrate, a current clocking frequency, loopback test results, or BERT results. Alternatively, the serial connection may be a single serial interface capable of facilitating two-way communication between the eye opener control module 350 and the host.

Figure 8:
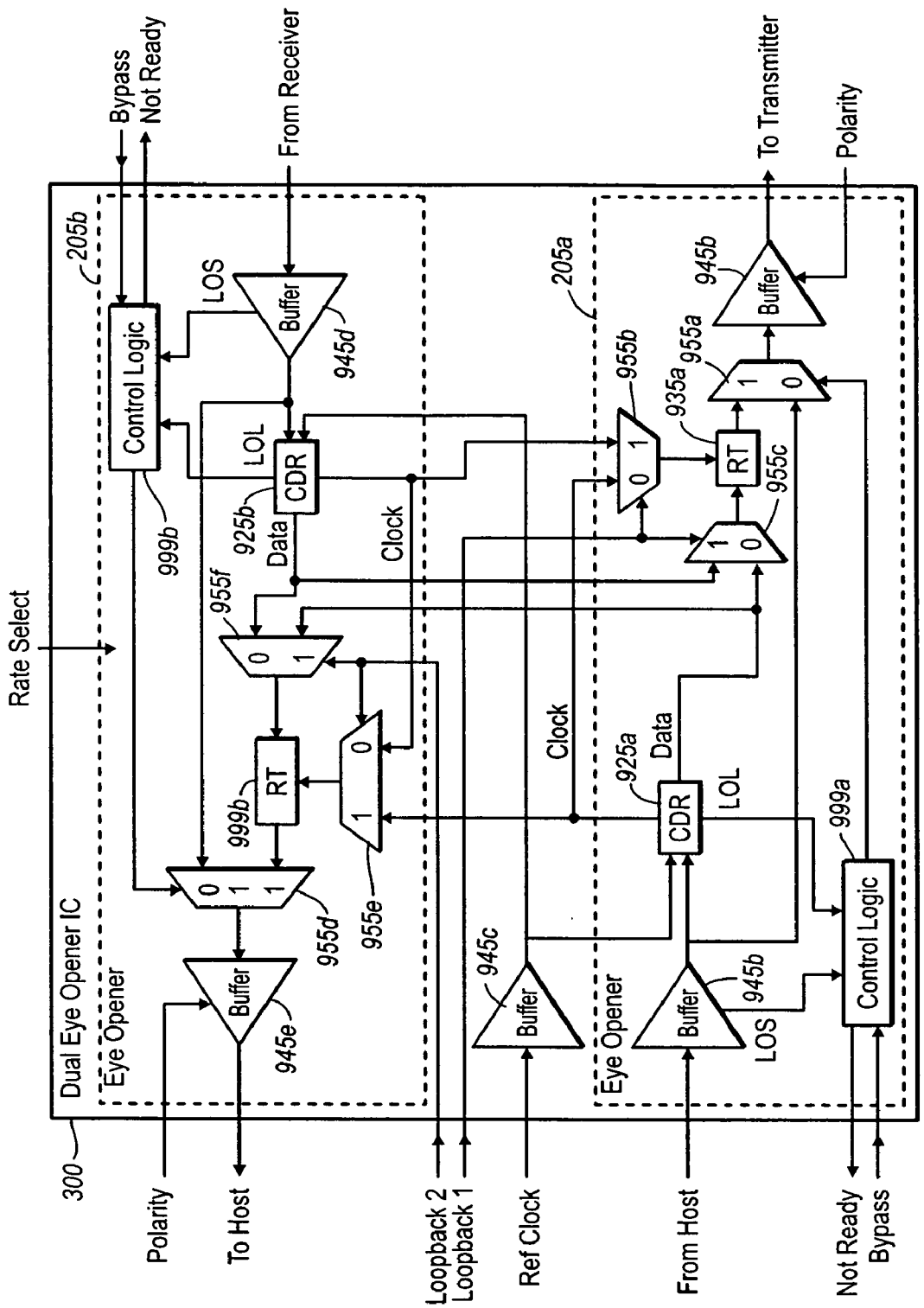
FIG. 8 is an example of an IC for providing dual eye opening functionality to a transceiver data path with a serial connection to a host.

FIG. 8 is an example of an IC for providing dual eye opening functionality to a transceiver data path with a serial connection to a host. The dual eye opener IC 300 includes an eye opener 205a that receives a data from the host and sends a data to a transmitter, and an eye opener 205b that receives a data from a receiver and sends a data to the host. Eye opener 205a includes a CDR 925a and an RT 935a to perform reshaping and retiming. Eye opener 205a also has embodiments for providing a not ready signal to the host or bypass functionality to the data path. Moreover, the eye opener 205b performs reshaping and retiming the data with a CDR 925b and an RT 935b.

The not ready signal output to the host from an output of a control logic 999b is conditioned upon receiving a LOS signal from an output of buffer 945d or a LOL signal from an output of the CDR 925b. The MUX 955d provides bypass functionality. Bypass functionality is activated with a signal from the output of control logic 999b to a selector input of the MUX 955d. In another embodiment the Tx clock functionality may be implemented in the eye opener 205a.

Figure 9:
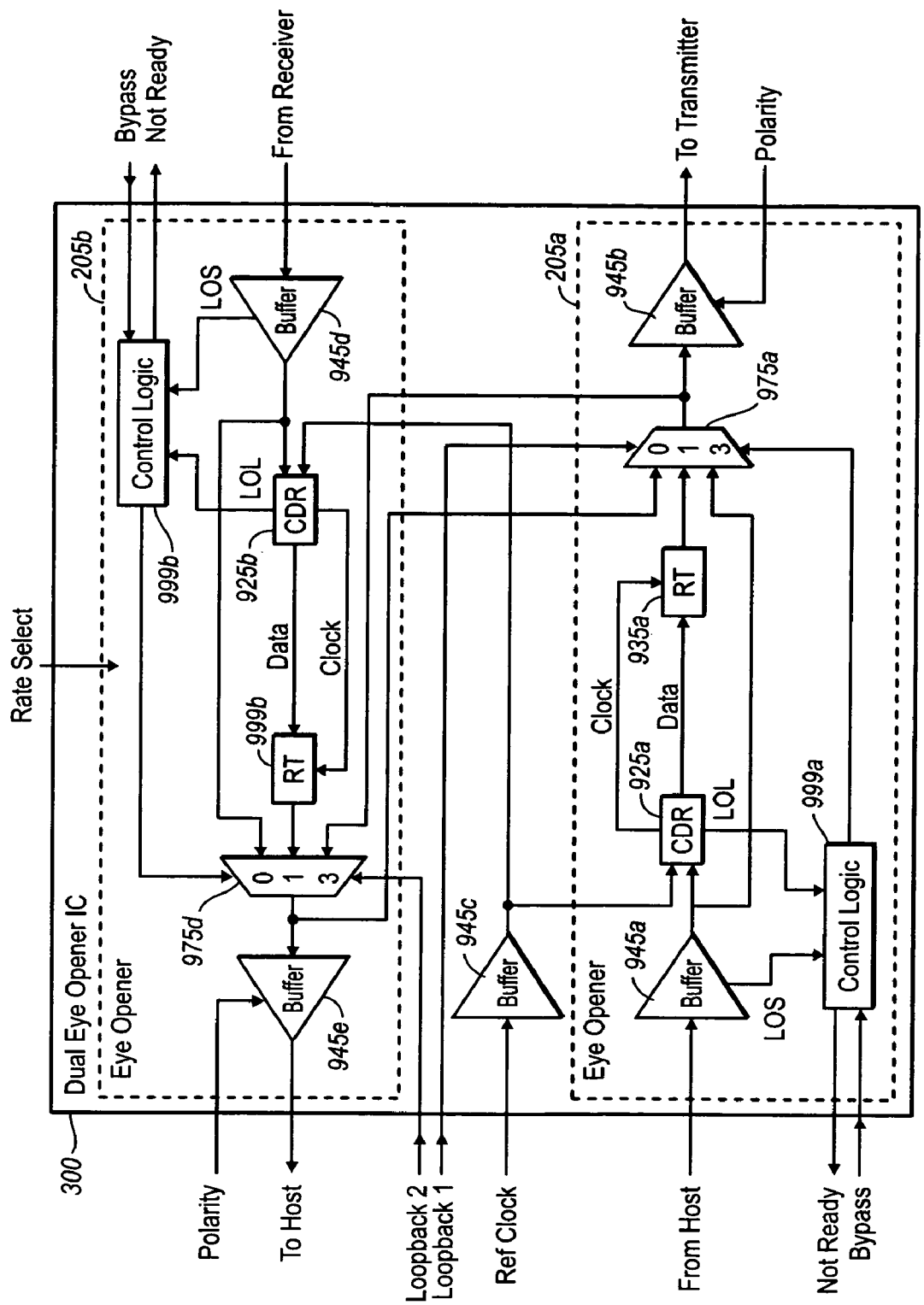
FIG. 9 is an additional example of an IC for providing dual eye opening functionality to a transceiver data path with a serial connection to a host.

FIG. 9 is an additional example of an IC for providing dual eye opening functionality to a transceiver data path with a serial connection to a host. A MUX 975a provides an improved IC that includes both bypass and loopback functionality, along with other functionalities described above. If the first selector input of the MUX 975a receives the loopback signal, then the MUX 975a output switches to sending data received from the MUX 975b. If a second selector input of the MUX 975a receives the bypass signal from host or the LOL signal from the output of the CDR 925a, then the MUX 975a switches to sending data received from the output of the buffer 945a. The MUX 975a may be configured to implement either the loopback or the bypass when both selector inputs of the MUX 975a receive a signal. The MUX 975a replaces MUXs 955a, 955b, and 955c shown in FIG. 8, thereby reducing the component count, saving power, and causing less heat dissipation.

Figure 10:
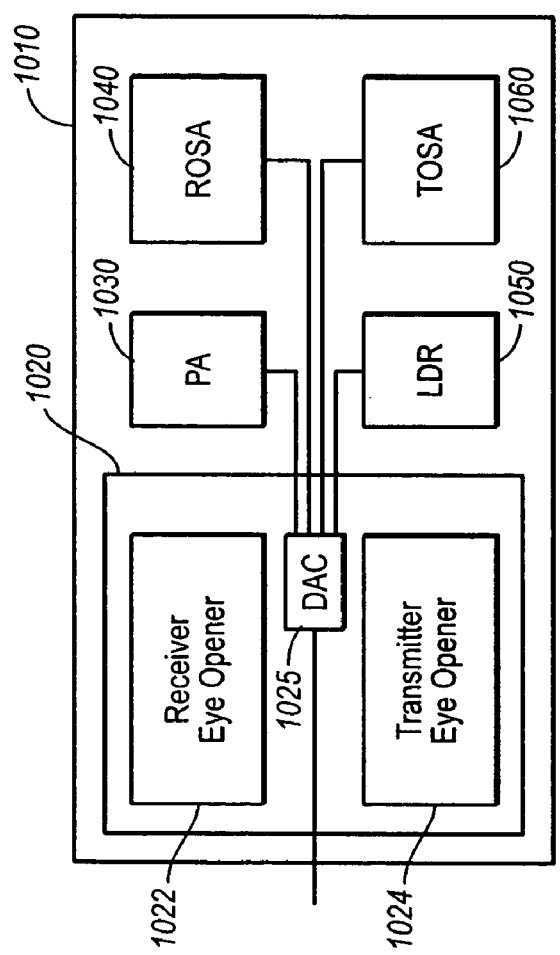
FIG. 10 illustrates a transceiver module comprising a DAC integrated on a chip with dual eye openers.

FIG. 10 illustrates a transceiver module comprising a DAC (digital to analog converter) on an integrated chip with dual eye openers. In this embodiment of dual eye opener IC 1020, a DAC 1025 converts digital signals sent through or from the IC 1020 to analog signals to control receiver and/or transmitter components. Accordingly, control signals sent to a post amplifier 1030, a ROSA 1040, a laser driver 1050, and a TOSA 1060 can control characteristics such as analog swing, bias, and rise and fall times. In one embodiment, the digital signals sent to the DAC 1025 are generated by the control module 350 (FIGS. 6-7).

Figure 11:
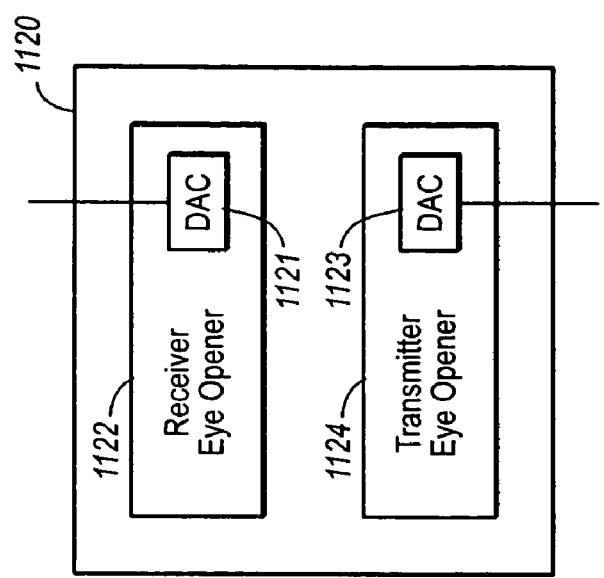
FIG. 11 illustrates a first DAC integrated into the receiver eye opener and a second DAC integrated into the transmitter eye opener.

FIG. 11 illustrates a first DAC 1121 integrated into the receiver eye opener and a second DAC 122 integrated into the transmitter eye opener. The DAC 1121 may control analog signal outputs of the receiver eye opener 1122 or analog signal inputs from a receiver. Likewise, the DAC 1123 may control analog signal outputs of the transmitter eye opener 1124 or analog inputs from the transmitter as described with respect to FIG. 10.

FIGS. 12A-D illustrate loopback modes integrated with dual integrated eye openers. A loopback mode allows an integrity check on a particular data path. Accordingly, a first loopback mode may allow an integrity check of one or more components along the particular data path on the module 200 or on an optical path on a network. A second loopback mode may allow an integrity check of a data path containing multiple components on the module 200. Thus, multi-mode loopbacks allow monitoring of data path integrity at different levels on the transceiver module 200. The transceiver module 200 includes an eye opener loopback control 400 within a eye opener control 350 used to control the loopback functionality on the module 200.

Figure 12A:
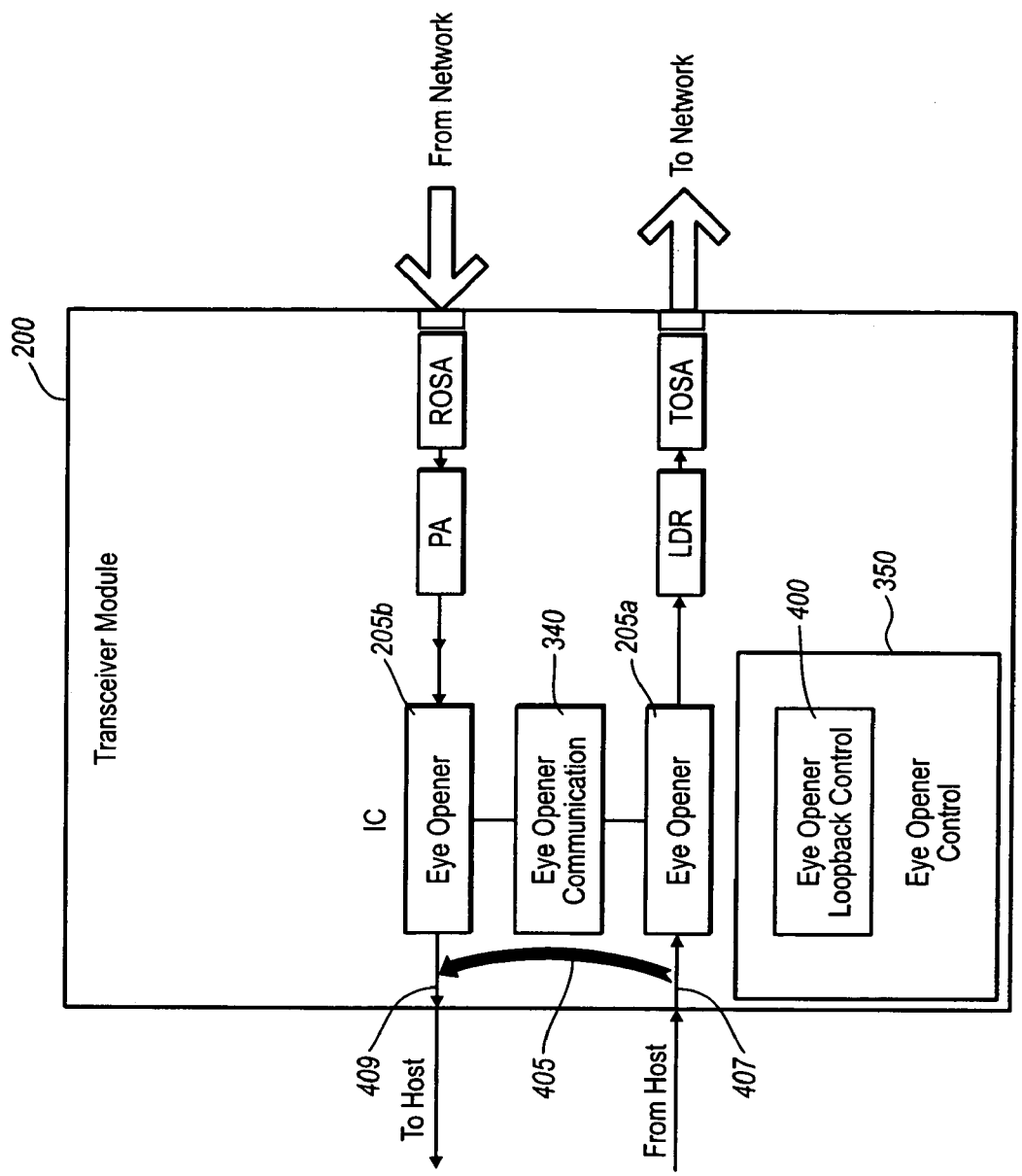
FIGS. 12A-D are block diagrams of loopback modes.

FIG. 12A illustrates a first loopback mode from the input 407 of the transmitter eye opener 205a to the output 409 of the receiver eye opener 205b. This first loopback 405 allows the host system 202 (FIG. 2) to check the function of the host board and check that the transceiver module 200 is correctly plugged into its connector and is powered up properly. Because this first loopback 405 is integrated within the module 200, an installer can quickly determine whether the transceiver module 200 is properly installed or whether a failure occurred within the transceiver module 200 or host 202 (FIG. 2).

Figure 12B:
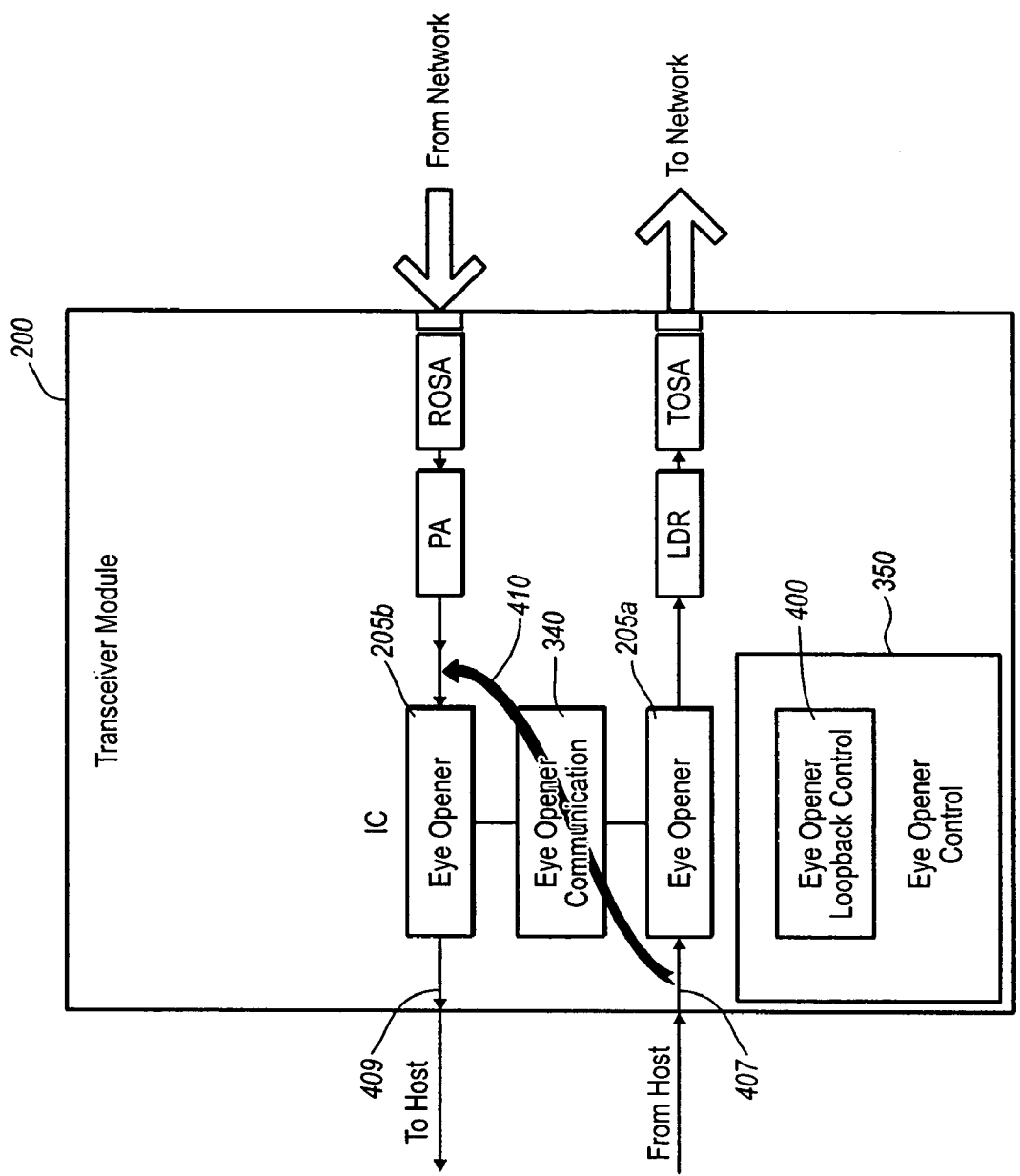

FIG. 12B is an illustration of a transceiver module having a second loopback mode integrated with dual eye openers according to an embodiment of the present invention. This second loopback 410 allows the host system 202 (FIG. 2) to check that the receiver eye opener 205b is operating properly and that the transceiver module 200 is properly plugged into its connector and powered up properly. Because the second loopback 410 is integrated within the transceiver module 200, a manufacturer can quickly test the integrity of the receiver eye opener 205b prior to shipment as well as allowing a network administrator to easily check the receiver eye opener 205b after installation of the transceiver module 200.

Figure 12C:
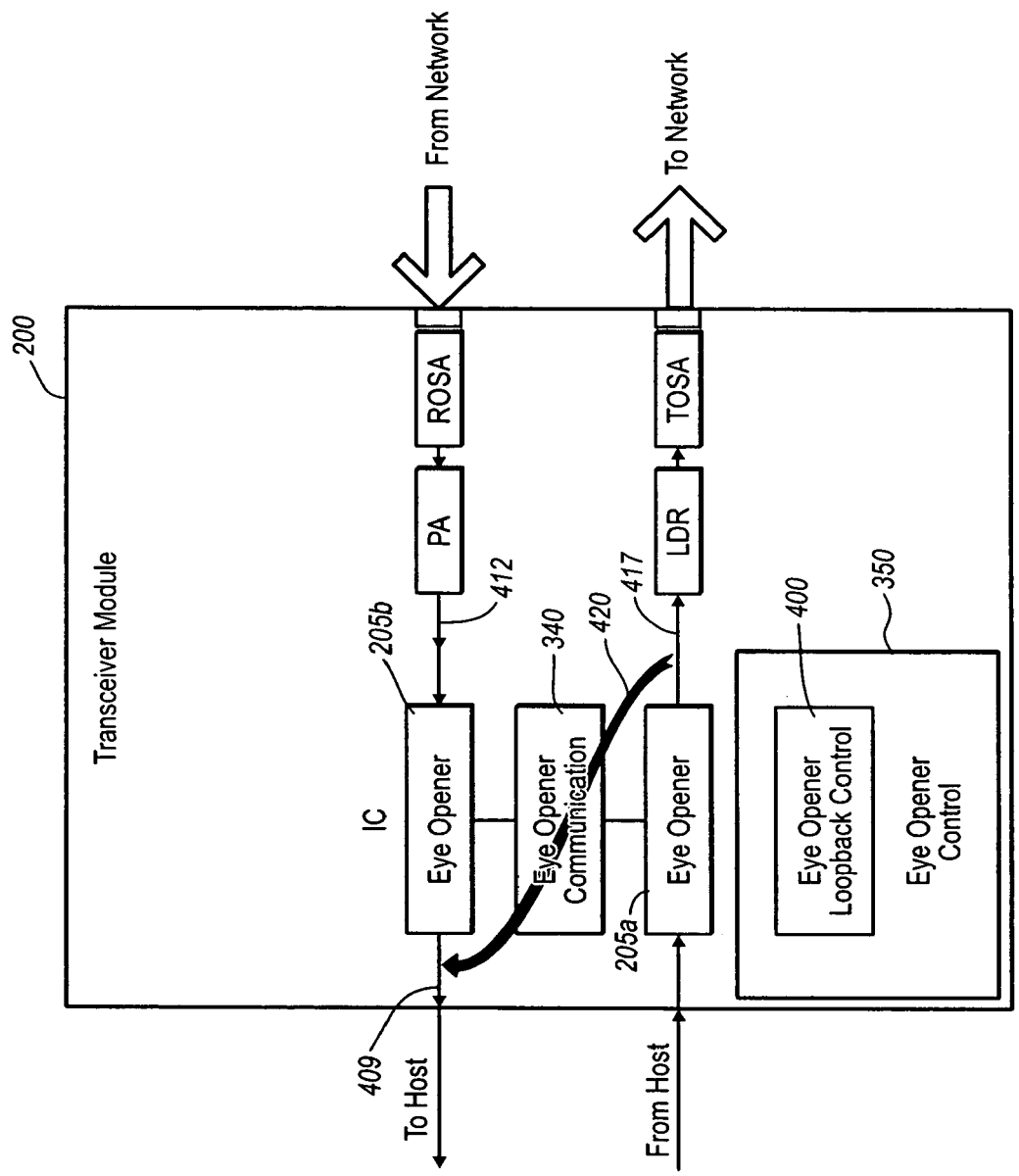

FIG. 12C is an illustration of a transceiver having a third loopback mode integrated with dual eye openers according to an embodiment of the present invention. This third loopback 420 allows the host system 202 to check that the transmitter eye opener 205a is operating properly and that the transceiver module 200 is properly plugged into its connector and powered up properly. Because the third loopback 420 is integrated within the transceiver module 200, a manufacturer can quickly test the integrity of the transmitter eye opener 205a prior to shipment as well as allowing a network administrator to easily check the transmitter eye opener 205a after installation of the transceiver module 200.

Figure 12D:
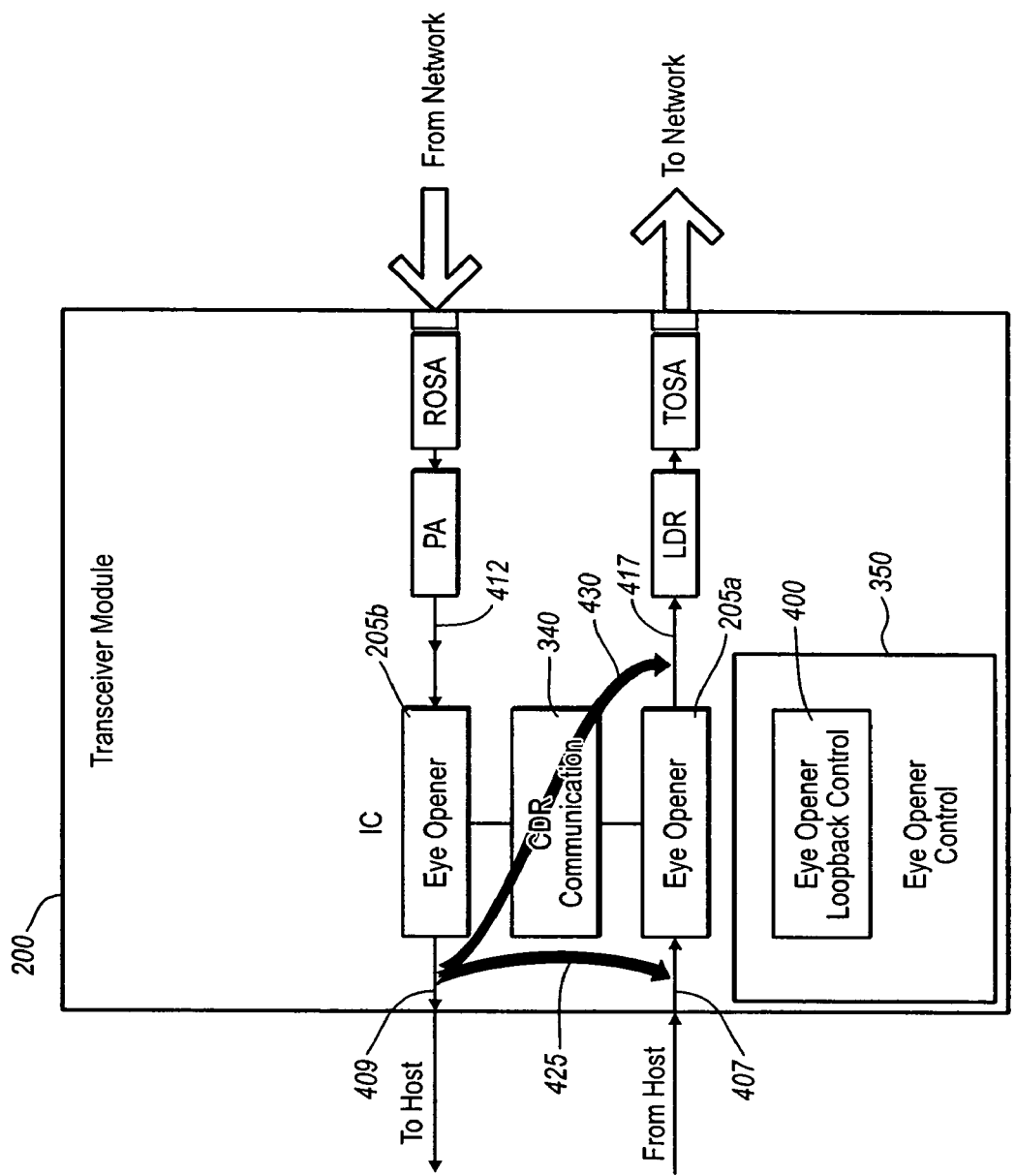

FIG. 12D is an illustration of a transceiver module having a fourth and fifth loopback mode integrated with dual eye openers according to an embodiment of the present invention. The fourth loopback 425 is from the output 409 of the receiver eye opener 205b to the input 407 of the transmitter eye opener 205a. This fourth loopback 425 allows for testing of the transceiver module 200 and an optical data path on a network. Thus, a network administrator or module manufacturer can quickly test the entire transceiver module 200 and test whether the module 200 is properly coupled onto fiber. The fifth loopback 430 is from the output 409 of the receiver eye opener 205b to the output 417 of the transmitter eye opener 205a. This fifth loopback 430 allows for testing of the front end components on the transceiver module 200, the receiver eye opener 205b, and an optical data path on a network. A sixth loopback (not pictured) is from the output 417 of the transmitter eye opener 205a to the input 412 of the receiver eye opener 205b.

The above-described loopback modes are examples of loopbacks that may be integrated in the transceiver module 200 and is not meant to include all possible loopback modes. For example, loopbacks may be integrated from the input 412 of the receiver eye opener 205b to both the input 407 and the output 417 of the transmitter eye opener 205a. These loopbacks would allow testing of the front end components and an optical path as well a combination of front end components, the receiver eye opener 205a and an optical path. Additional loopbacks may also be integrated within the transceiver module 200 to test other data paths and/or components.

Referring to the example of FIG. 8, MUXs 955b, 955c, 955f, and 955e provide loopback functionality for testing components as described above. In eye opener 205a, MUXs 955b and 955c receive a first loopback signal from the host to each selector input. When the first loopback signal is high, the output of the MUX 955c switches from sending data received from the output of the CDR 925a to the input of the RT 925a to sending data received from the output of the CDR 925b to the input of the RT 925a. At the same time, the output of the MUX 955b switches from sending the recovered clock signal received from the output of the CDR 925a to the input of RT 935a to sending the recovered clock signal received from the output of the CDR 925b to the input of RT 935b.

In eye opener 205b, MUXs 955e and 955f receive a second loopback signal from the host to each selector input. When the second loopback signal is high, the output of MUX 955f sends data received from the CDR 925a to the input of RT 935b rather than data from CDR 925b, and a recovered clock signal received from the CDR 925a to the input of RT 935b rather than from the CDR 925a.

Figure 13A:
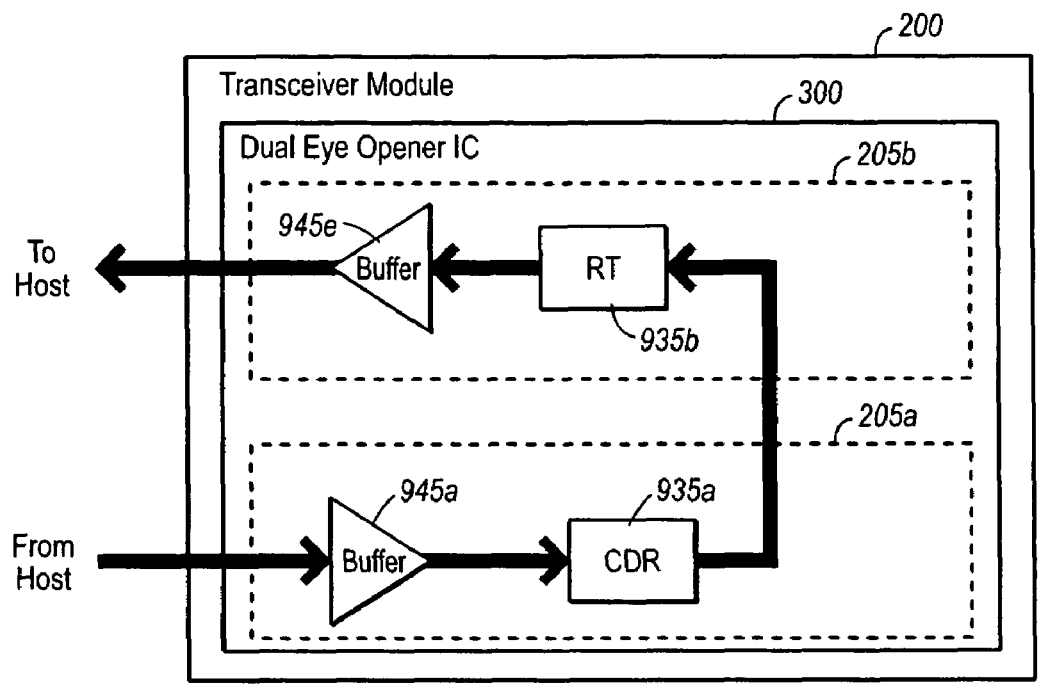
FIGS. 13A-D are logic diagrams of loopback modes of an integrated chip with dual eye openers.

FIG. 13A is an embodiment of the third loopback mode of a dual eye opener IC such as in FIG. 12B. For the purposes of illustration, some components that are transparent to the data stream during normal operation are omitted. The dual eye opener IC 300 includes eye opener 205a and eye opener 205b. In loopback mode, an input of a buffer 945a receives the data stream from the host into eye opener 205a, and an input of a CDR 935a receives the data stream from an output of the buffer 945a. In eye opener 205b, an input of an RT 935b receives the data stream from an output of the CDR 935a, an input of a buffer 945e receives the data stream from an output of the RT 935b and transmits the data stream to back to the host.

In an alternative embodiment of the third loopback mode, the buffer 945a may be isolated by coupling the output of the buffer 945a to the output of the buffer 945e as in the first loopback mode. It will be understood that each of the other loopback modes may be similarly implemented. The second loopback mode may be implemented by coupling the input of the first CDR 935a (FIG. 9) or the input of the first buffer 945a to the output of the first CDR 925b (FIG. 9) or the input of the buffer 945a (FIG. 9). The fourth loopback mode may be implemented by coupling the output of the second CDR 925b (FIG. 9) to the input of the first CDR 925b (FIG. 9). The fifth loopback mode may be implemented by coupling the output of the second CDR 925b (FIG. 9) to the output of the first CDR 925a (FIG. 9). The above-described loopback implementations are examples that are not meant to include all possible implementations.

Figure 13B:
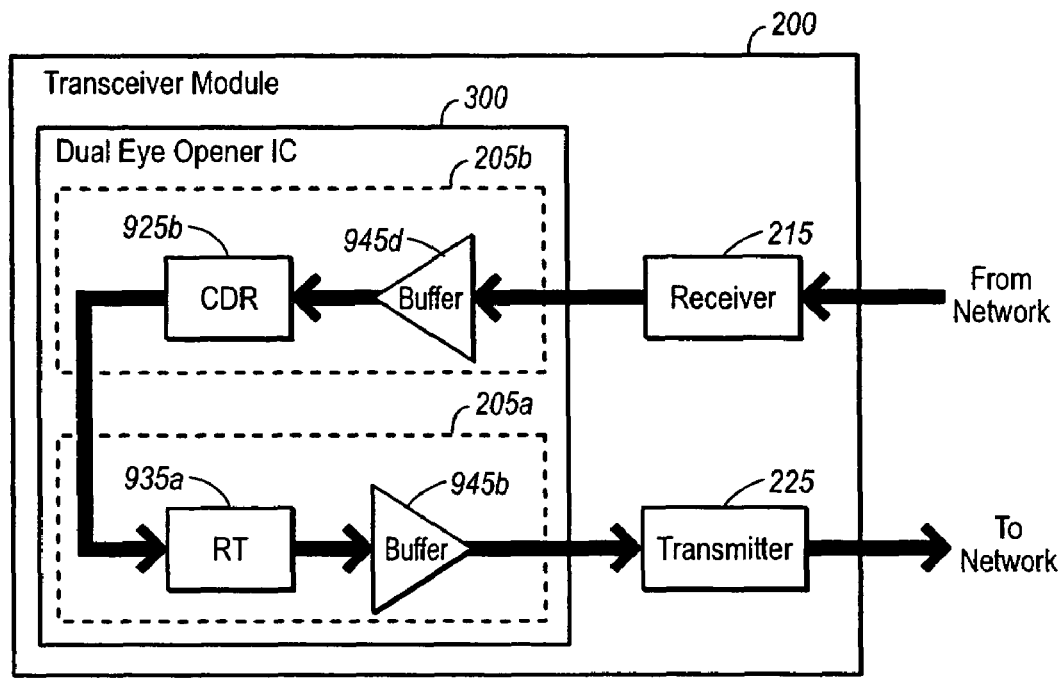

FIG. 13B is an embodiment of the sixth loopback mode of a dual eye opener IC such as in FIG. 12B. An input of the receiver 215 receives the data path from the network. In the eye opener 205b, an input of a buffer 945d receives the data path from an output of a receiver 215, and an input of a CDR 925b receives the data path from an output of the buffer 945d. In the eye opener 205a, an input of a RT 935a receives the data path from an output of the CDR 925b, and an input of a buffer 945b receives the input from an output of the RT 935a. An input of a transmitter 225 receives the data path from an output of the buffer 945b and transmits the data path to the network. Other embodiments of the sixth loopback mode may be implemented where the data path is output from the eye opener 205b from a different component, such as the buffer 945d, and the data path is received in the eye opener 205a in a different component such as the buffer 945b.

Figure 13C:
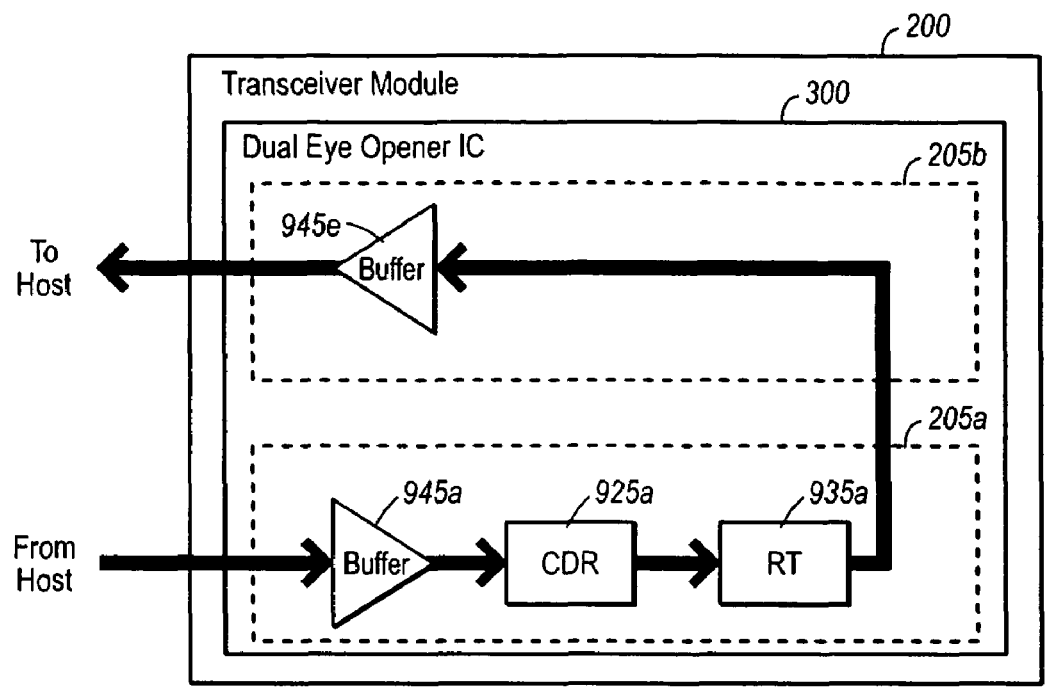

FIG. 13C is an embodiment of the third loopback mode data path of a dual eye opener such as in FIG. 12C. In the eye opener 205a, an input of a buffer 945a receives the data stream from the host, an input of a CDR 925a receives the data stream from an output of the buffer 945a, and an input of RT 935a receives the data stream from an output of the CDR 925a. In the eye opener 205b, an input of a buffer 945e receives the input from an output of the RT 935a and transmits the data stream back to the host.

Figure 13D:
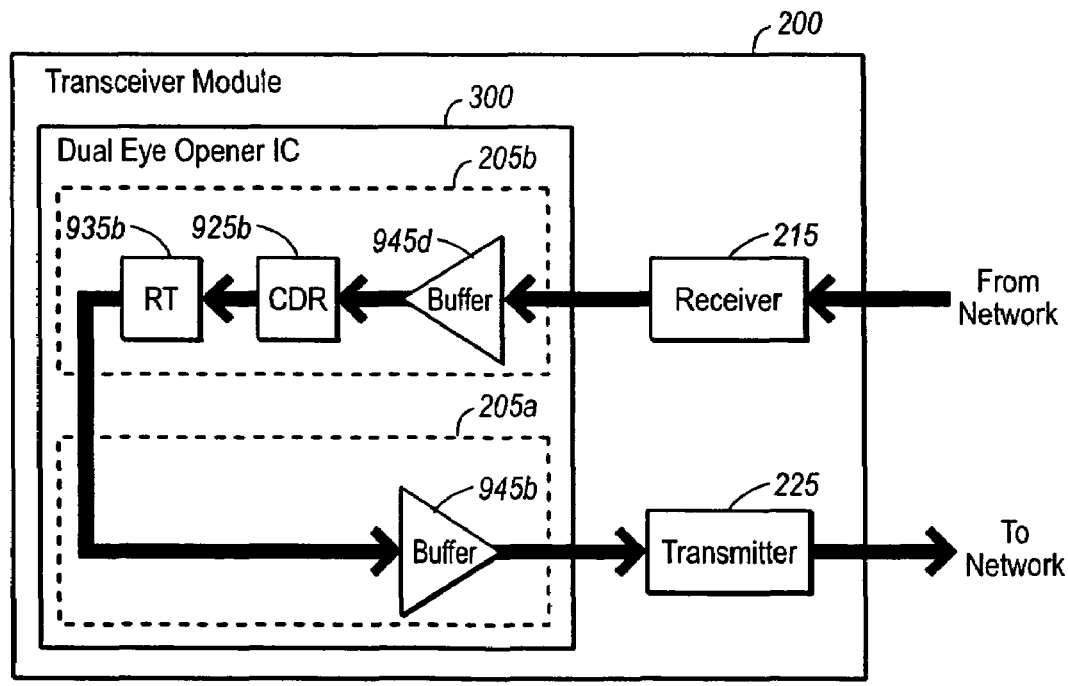

FIG. 13D is an embodiment of the sixth loopback mode data stream of a dual eye opener such as in FIG. 12C. An input of a receiver 215 receives the data stream from the network. In an eye opener 205b, an input of a buffer 945d receives the data stream from an output of the receiver 215, an input of a CDR 925b receives the data stream from an output of the buffer 945d, and an input of RT 935b receives the data stream from an output of the CDR 925b. In an eye opener 205a, an input of a buffer 945b receives the input from an output of the RT 935b. An input of a transmitter 225 receives the data stream from an output of the buffer 945b and transmits the data stream to the network.

Figure 14:
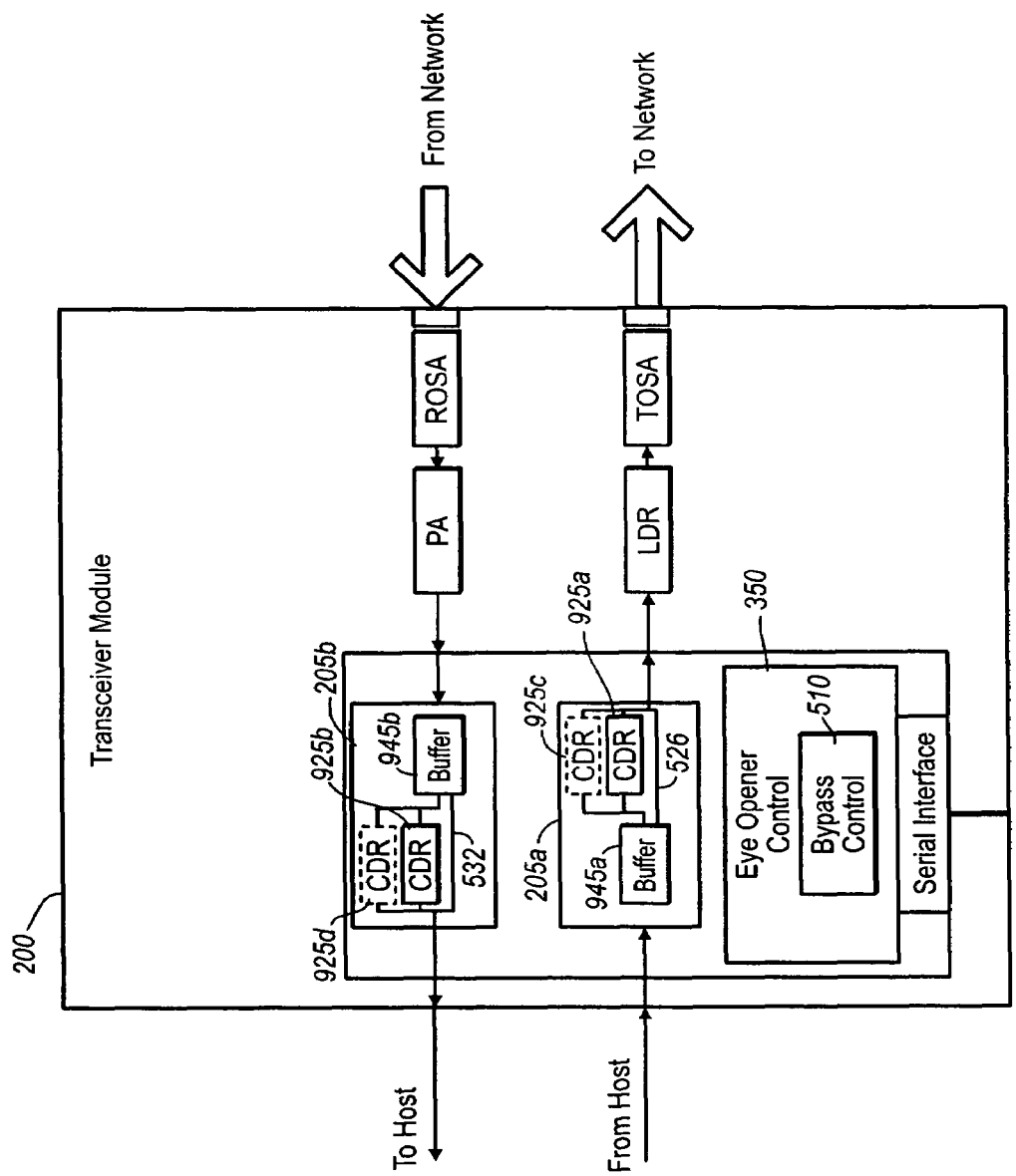
FIG. 14 is an illustration of a transceiver module with bypass functionality integrated with a transmitter and a receiver each having multiple CDR components according to an embodiment of the present invention.

FIG. 14 is an illustration of a transceiver module with bypass functionality integrated with a transmitter and a receiver each having multiple CDR components according to an embodiment of the present invention. A conventional eye opener operates properly on signals within a small range of data rates. Typically, an eye opener will lock onto an incoming data stream only at a certain data rate or within a narrow data rate range. Additionally, some eye openers may be able to lock onto data at sub-harmonics of an operable data rate. However, at other data rates where the eye opener is unable to lock onto the data, the output on the eye opener is typically squelched. This limitation of conventional eye openers reduces the flexibility of a transceiver module to operate in different network environments. In particular, conventional eye openers preclude a protocol agnostic transceiver module, with eye opener functionality on chip, that may operate in accordance with different types of protocols and data rates.

The bypass functionality of the present invention allows an eye opener to automatically pass data through if it is unable to lock onto the data because it is not in a particular data rate band. In particular, the eye opener may be designed to pass-through a data stream having a data rate such that clock and data recovery is not required to remain within an acceptable jitter budget. For example, this pass through functionality would allow a 10 Gb/s Ethernet transceiver to operate in particular Fibre Channel environments where a eye opener is not required. Additionally, the functionality allows debugging or engineering of a link to occur without the presence of the non-linear regeneration feature of the eye opener. The pass-through functionality of the eye opener may be automatically controlled depending on whether the eye opener is locked to the data. The eye opener may generate a LOL, signal which is a signal of general use, but which can also be used for this purpose. The pass-through functionality may also be externally controlled by a control signal or by a digital signal on a digital interface. It is recognized that the bypass feature is valuable as a diagnostic and development tool even for data rates that are within the locking range of the eye opener.

One embodiment of a transceiver module 200 having pass-through functionality, shown in FIG. 14, includes a receiver eye opener 205b, an eye opener 205a, and pass-through control 510 in the eye opener control module 350. Data received from the receiver is stored within a fourth buffer 945d in the receiver eye opener 205b without resetting a jitter budget within the data path. The fourth buffer 945d is coupled to a bypass line 532 and a second CDR 925d. The pass-through control 510 toggles the output on the fourth buffer 945d between the pass-through line 532 and the second CDR 925d depending on whether the second CDR 925b can lock onto the data. The bypass control 510 may be designed to automatically toggle between the outputs on the fourth buffer 945d or be manually controlled by an operator via a control interface (e.g., serial interface 385). For example, a fourth CDR 925d may also be coupled to the fourth buffer 945d to operate on a different data stream than data operated on by the second CDR 925b. Also, this fourth CDR 925d would allow toggling by the pass-through control 510 between three different data paths. It will be understood that multiple eye openers may operate within the receiver eye opener 205b to facilitate different data streams being provided eye opener functionality on the eye opener 205b. Additionally, rate detection may be integrated along a receive path or transmit path to enable intelligent detection of data rates received from both a host and a network. According to one example, an adjustable wideband oscillator and logic circuitry may be used to identify a rate on a particular signal. In another example, multiple narrowband oscillators, a discriminator, and logic circuitry may also be used to identify the rate of a signal. This rate detection facilitates the use of multiple eye openers along a data path resulting in eye opener functionality on a single data path being available to signals having different data rates.

A similar bypass operation may be provided on the transmitter eye opener 205a. In particular, a first buffer 945a is coupled to a first CDR 925a and a pass-through line 526. The pass-through control 510 toggles data between the first CDR 925a and the pass-through line 526 depending on the characteristics of the data. Additionally, multiple eye openers (e.g., a third CDR 925c) may operate within the transmitter eye opener 205a to facilitate different data streams being provided eye opener functionality on the eye opener 205b.

Figure 15:
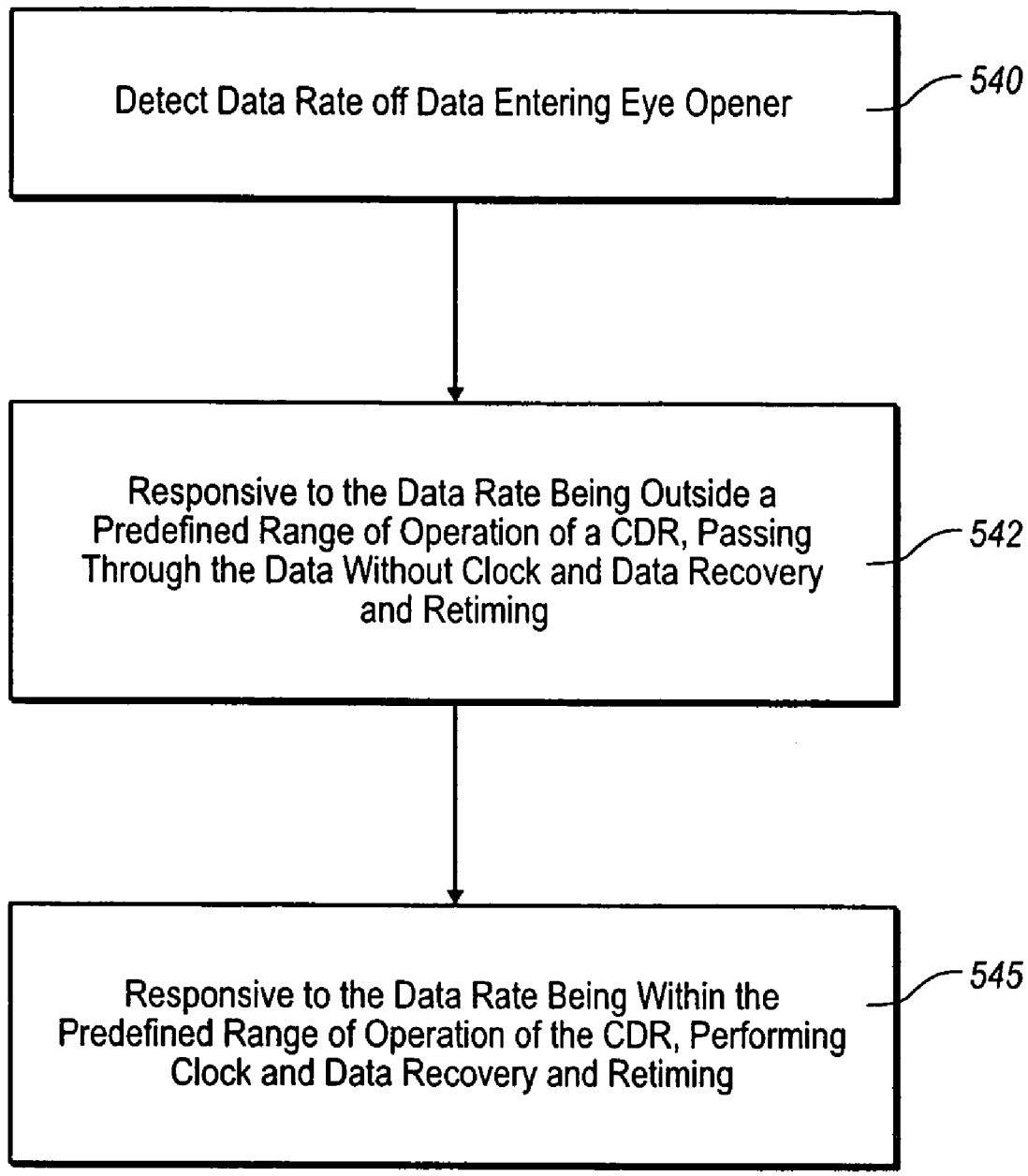
FIG. 15 is a flowchart illustrating a first method bypass method operable in a transceiver module with an integrated transmitter and receiver, each having multiple CDRs.

FIG. 15 is a flowchart illustrating a first method bypass method operable in a transceiver module with an integrated transmitter and receiver, each having multiple CDRs. A data rate of a data stream entering a eye opener is detected 540. In response to the detected data rate being outside a predefined range of operation of an eye opener, the data stream is passed through the transceiver module without eye opening 542. This bypass functionality may be automated on the CDR 1-IC or manually controlled by a user. In response to the detected data rate being within the predefined range of operation of an eye opener, eye opening is performed on the data stream to reduce jitter 545.

Figure 16:
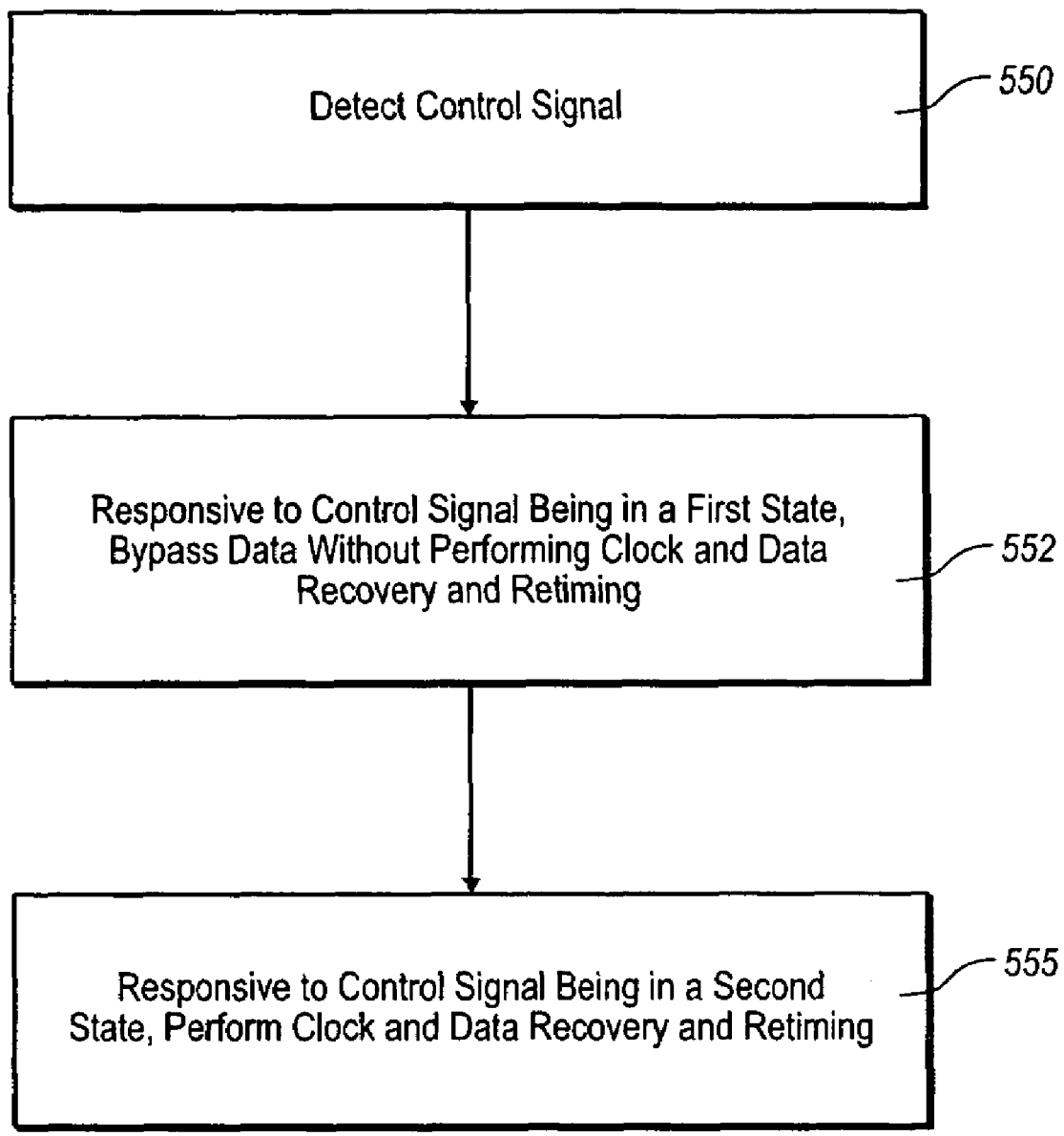
FIG. 16 is a flow chart of a second bypass method operable in a transceiver module with a transmitter and a receiver each having multiple CDR components according to an embodiment of the present invention.

FIG. 16 is a flow chart of a second bypass method operable in a transceiver module with a transmitter and a receiver each having multiple CDR components according to an embodiment of the present invention. A control signal is detected 550 by a buffer storing a data stream. In response to the control signal being in a first state (e.g. high), the data stream will be passed through a transceiver module without eye opening 552. In response to the control signal being in a second state (e.g., low), a eye opening is performed on the data stream 555.

Figure 17:
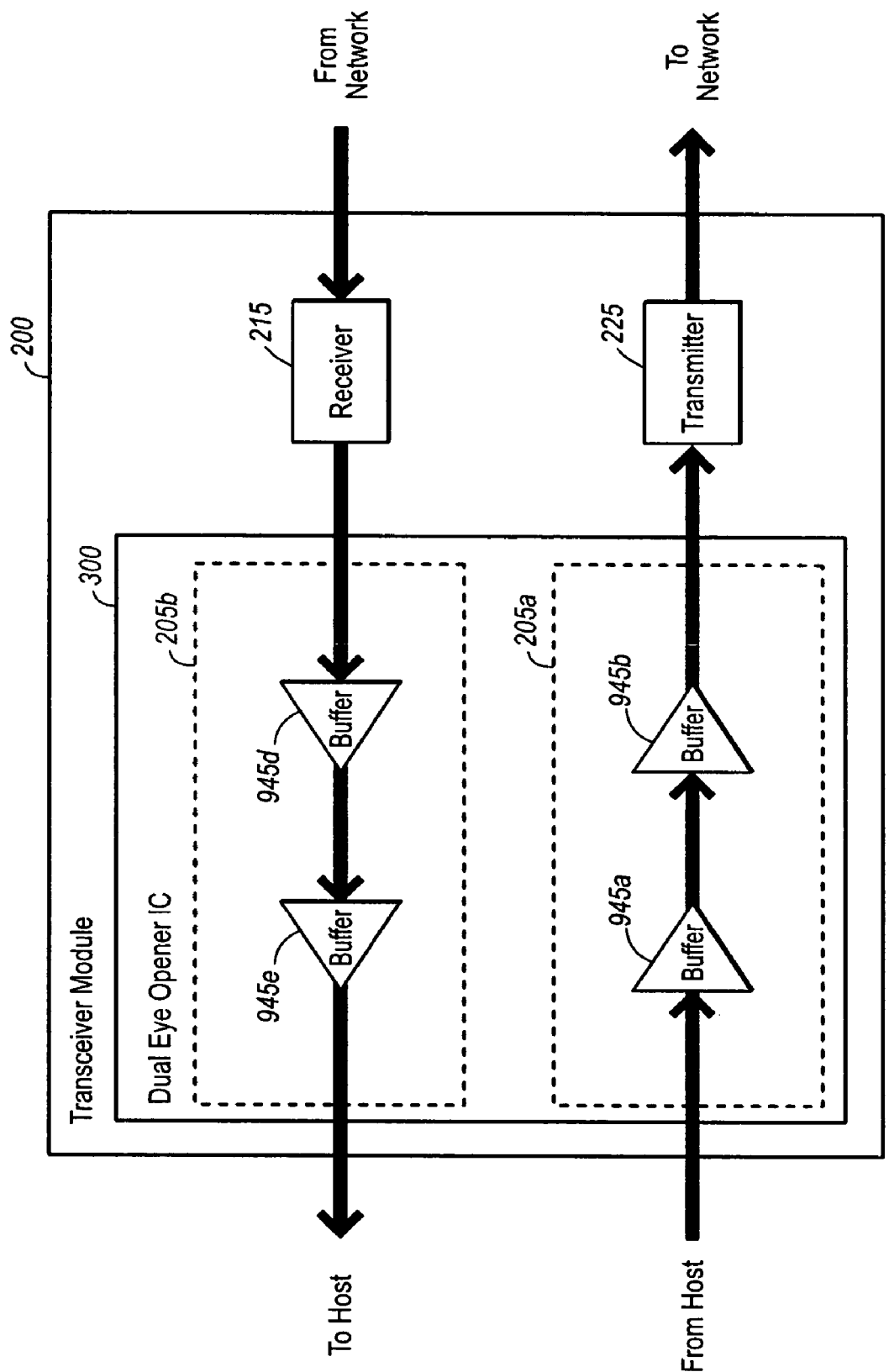
FIG. 17 is an embodiment of the bypass functionality of a dual eye opener IC such as in FIG. 8 or 9.

FIG. 17 is an embodiment of the bypass functionality of a dual eye opener IC such as in FIG. 8 or 9. The dual eye opener IC 300 includes an eye opener 205a and an eye opener 205b. Because the CDR and RT modules do not operate on the data path, data from the host received into an input of the buffer 945a is sent directly from an output of the buffer 945a to an input of the buffer 945b. An output of the buffer 945b sends data path to an input of a transmitter 225 for transmission to the network. Likewise, data received from the network into an input of a receiver 215 and sent to from an output of the receiver 215 to an input of the buffer 945d is sent directly from an output of the buffer 945d to an input of the buffer 945e. An output of the buffer 945e sends the data to the host. A signal may be included for manual override of the bypass mode. The control signals necessary to activate bypass functionality are discussed above.

In one embodiment, adaptive equalization is performed on signal by the host board during bypass mode for noise reduction and/or signal processing. The not ready signal may be polled to determine whether the eye opener is currently operating in bypass mode, initiating the adaptive equalization functionality when the not ready signal is high. The adaptive equalization feature advantageously compensates for link dispersion as a substitute for retiming and reshaping ordinarily provided by the eye opener.

Figure 18:
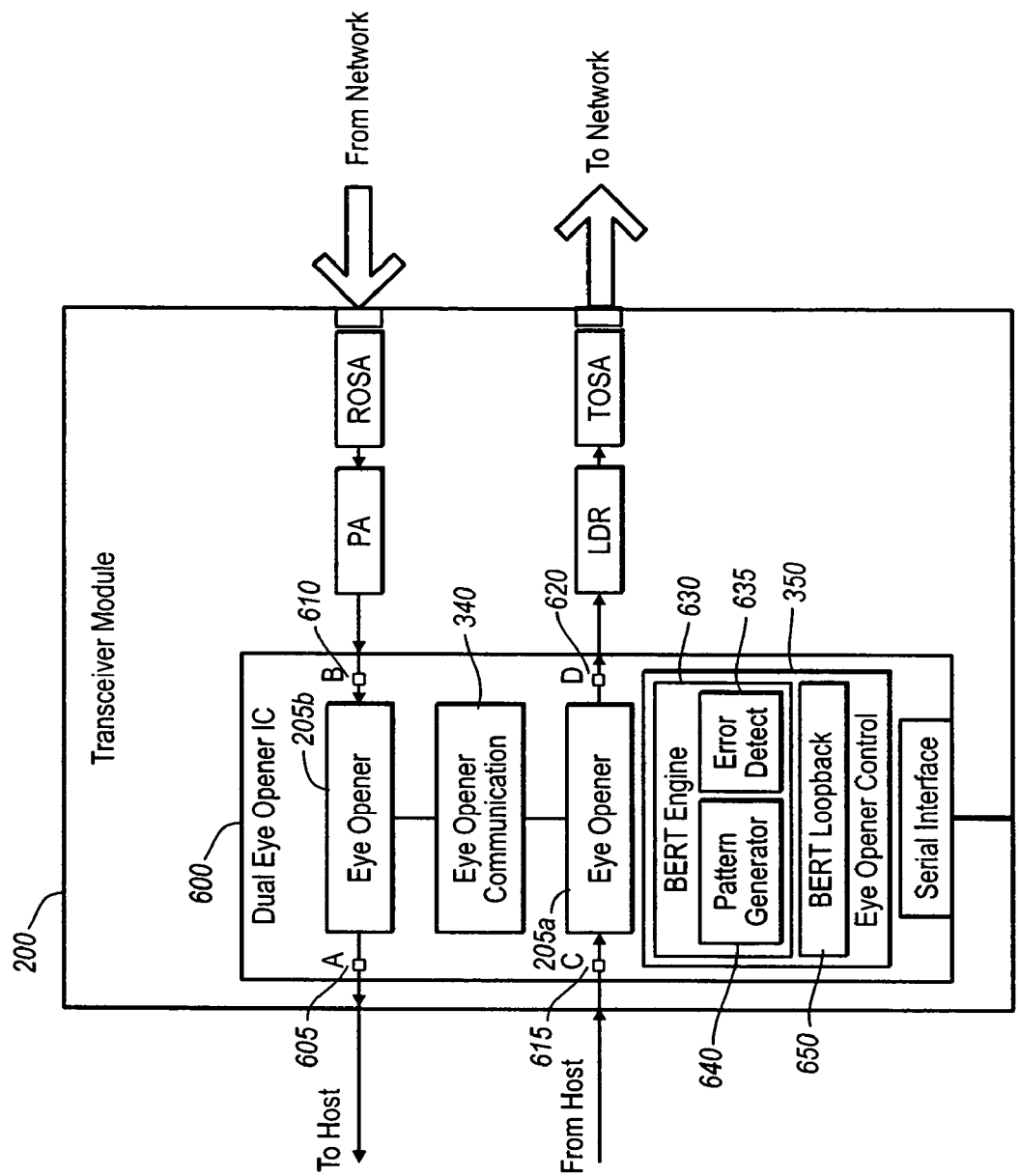
FIG. 18 is an illustration of a transceiver module having a BERT engine integrated with dual eye openers according to an embodiment of the present invention.

FIG. 18 is an illustration of a transceiver module having a BERT engine integrated with dual eye openers according to an embodiment of the present invention. According to one embodiment of the invention, a BERT engine 630 is integrated in a chip 600 having the transmitter eye opener 205a and the receiver eye opener 205b. The BERT engine 630 comprises a pattern generator 640, an error detector 635, and a BERT loopback control 650. In another embodiment, the BERT engine 630 is integrated within the eye opener control module 350.

The BERT engine eye opener uses test points integrated within the data paths to inject and receive bit sequences that are used to test the bit error rate associated with particular paths. In this example, four test points are integrated on the transceiver module 200 and are identified as points A 605, B 610, C 615, and D 620. These test points 605, 610, 615, 620 allow the BERT engine 630 to inject and retrieve bit sequences on a data path. Using these test points, the BERT engine 630 may determine a bit error rate on external optical paths on an attached network internal electrical paths or a combination of both electrical and optical paths.

The BERT engine 630 is useful both as a diagnostic function for end-customers in their systems, but is also useful as part of the module manufacturing process. For example, a manufacturer may perform integrity tests on the transceiver module 200 to ensure that the module passes a quality test. The BERT engine 630 may test internal paths on the module 200 during various operating conditions such as operating within a temperature chamber under temperature cycle or voltage margining. This feature provides a more efficient method of testing the module 200 when compared to more traditional external BERTs. Additionally, both the loopback modes and BERT engine 630 may operate in transponder modules as well.

Figure 19:
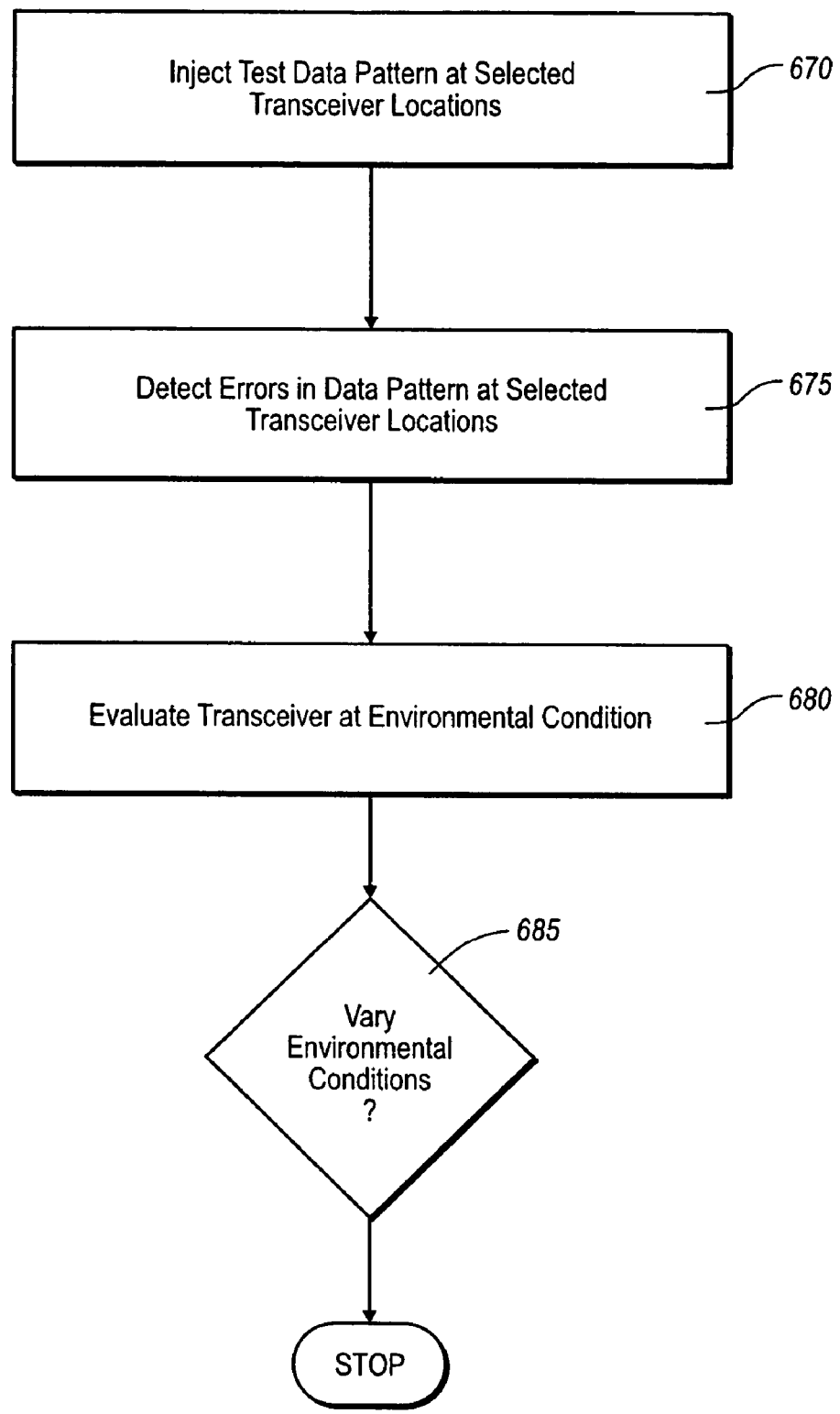
FIG. 19 is a flow chart of a BERT testing method operable in a transceiver module having dual integrated eye openers.

FIG. 19 is a flow chart of a BERT testing method operable in a transceiver module having dual integrated eye openers. A bit sequence or test pattern is inserted 670 at a particular test point on the transceiver module 200. The bit sequence is output by the pattern generator 640 (FIG. 18). The pattern generator may use psuedo-random numbers and/or characters in the output or a pattern stored in a memory. The bit sequence travels along a path and is retrieved at another test point.

Errors within the bit sequence are detected 675 and evaluated by the error detector 635 (FIG. 18). This error rate testing and evaluation may occur under various environmental conditions 680 allowing the BERT engine 630 to test the module 600 at different environmental conditions 685 and retest the bit error rate of the path under a new condition. BERT engine 630 results may be sent to the host for evaluation.

Figure 20:
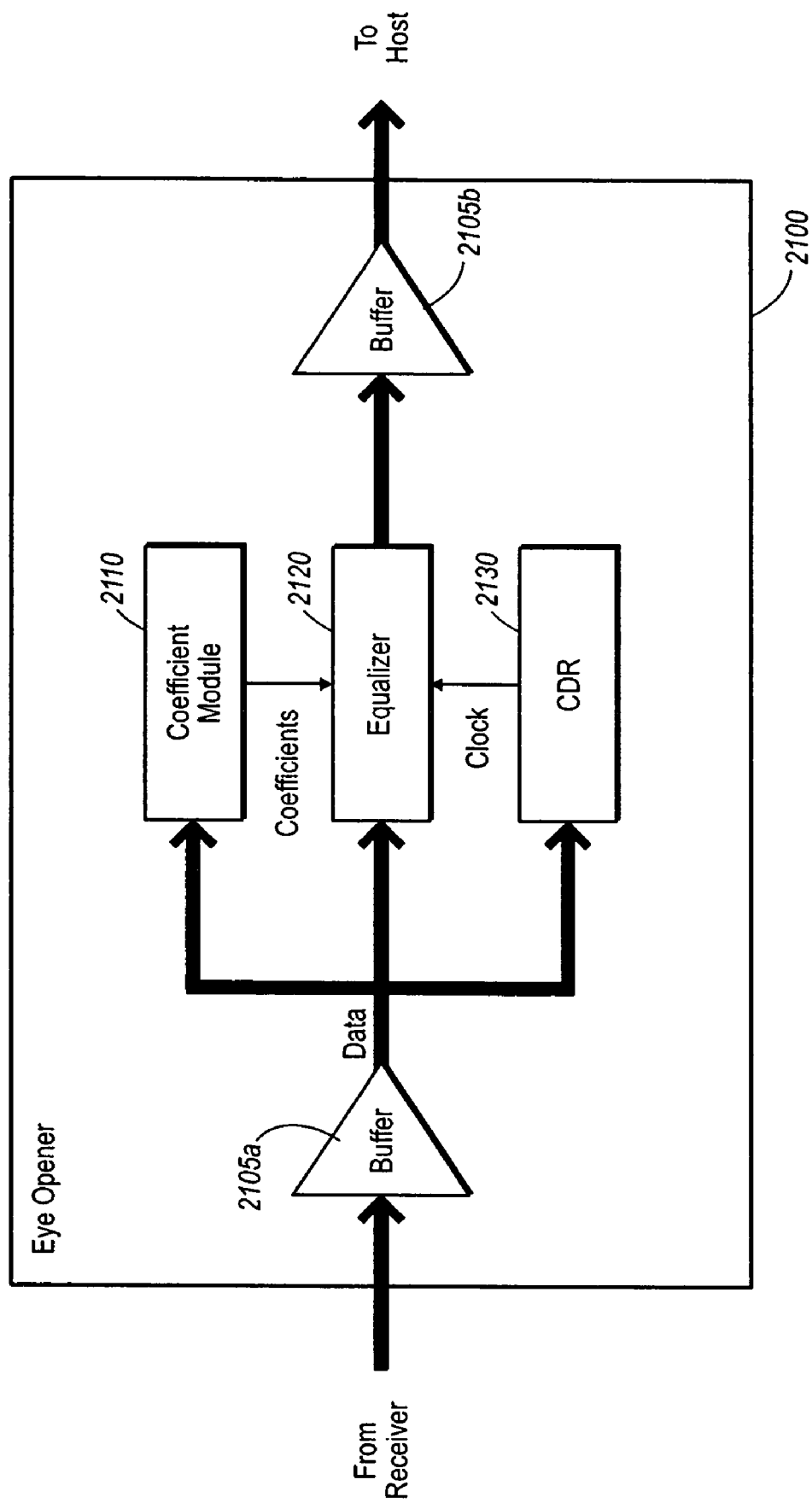
FIG. 20 illustrates an embodiment of an eye opener having an equalizer.

FIG. 20 illustrates a first embodiment of an eye opener having an equalizer. The data path of eye opener 2100 comprises an equalizer 2120, which receives data from a buffer 2105a and outputs data to a buffer 2105b. The buffer 2105a receives data from a receiver and the buffer 2105b sends data to a host. In another embodiment, the buffer 2105a receives data from the host and the buffer 2105b sends data to a transmitter. In one embodiment the eye opener 2100 conditions a signal in bypass mode.

The equalizer 2120 resets the data path's jitter budget by reshaping and retiming the data to remove channel noise from sources such as inter-symbol interference. The equalizer 2120 is coupled to receive signals representing coefficients from a coefficient module 2110 and a clock signal from a CDR 2130. The equalizer 2120 is preferably an adaptive equalizer that adapts to channel conditions such as changing temperature, but in other embodiments, the equalizer 2120 may be a passive equalizer. Other embodiments of equalizers are disclosed in U.S. patent application Ser. No. 10/288,324, "System and Method for Reducing Interference in an Optical Data Stream," by Thomas J. Lenosky et al., filed on Nov. 5, 2002; U.S. Patent Application No. 60/423,970, "System and Method for Reducing Interference in an Optical Data Stream Using Multiple Selectable Equalizers," by Thomas J. Lenosky et al. filed on Nov. 5, 2002; and U.S. patent application Ser. No. 10/419,023, "Method And Apparatus For Reducing Interference in an Optical Data Stream Using Data-Independent Equalization," by Thomas J. Lenosky et al., filed on Apr. 17, 2003; all of which are herein incorporated by reference. The equalizer 2120 may comprise a feed forward filter having a finite impulse response, a DFE ('Decision Feedback Equalizer'), or the like, either alone or in combination. The output of the equalizer 2120 may be analog or digital, depending on the implementation. Further embodiments of the equalizer 2120 are discussed below.

The coefficient module 2110 provides coefficients to the equalizer 2120 by evaluating channel effects on the data. The coefficient module 2110 is coupled to receive the data from the buffer 2105a and send the coefficient signal to the equalizer 2120. The coefficient module 2110 may be implemented in hardware, software, or firmware. Further embodiments of the coefficient module 2110 are discussed below.

The CDR 2130 provides a clock to the equalizer 2120 by extracting a recovered clock signal from the data stream. The CDR 2130 is coupled to receive the data from the buffer 2105a and to send a clock signal to the equalizer 2120. One of ordinary skill in the art will recognize that the CDR 2130 may receive the data to recover the clock signal from other points in the data path such as at the equalizer 2120 output. Furthermore, the CDR 2130 may comprise the variations discussed herein.

Figure 21:
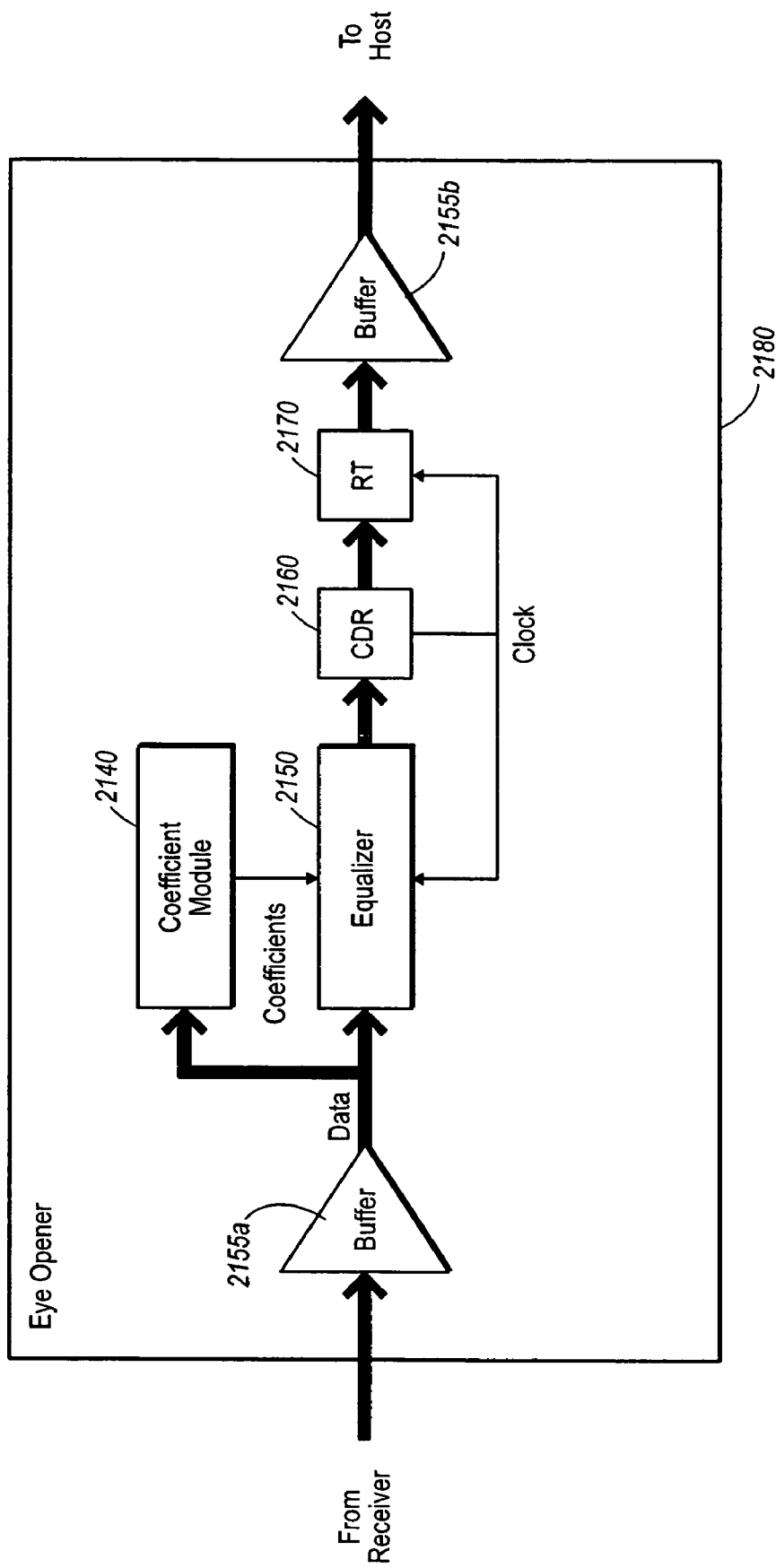
FIG. 21 illustrates an embodiment of an eye opener having an equalizer.

FIG. 21 illustrates a second embodiment of an eye opener having an equalizer. In this embodiment, the data path of eye opener 2180 comprises an equalizer 2150 in series with a CDR 2160 coupled with an RT 2170. The equalizer 2150 receives data from the buffer 2155a and the RT 2170 outputs data to the buffer 2155b. The CDR 2160 and equalizer 2150 may be disposed on separate chips or an integrated circuit. One advantage of this embodiment, is that the signal is conditioned by both the equalizer 2150 and CDR 2160, leading to a lower bit error rate.

In contrast to the embodiment of FIG. 21, the equalizer 2150 preferably reshapes and outputs an analog signal by removing channel effects. The equalizer 2150 receives a clock signal from the CDR 2160 to clock the equalizer's digital components.

The CDR 2160 and R T 2170 retime and reshape the equalized data. The RT 2170 receives a clock signal recovered by the CDR 2160. The CDR 2160 and RT 2170 may comprise the variations discussed herein.

In another embodiment, the equalizer 2150 is disposed on a first chip and the CDR 2160 and RT 2170 are disposed on a second chip. The first chip may also comprise a CDR to clock the digital portions of the equalizer 2150 without relying on the CDR 2160 of the second chip. Advantageously, by not traveling off-chip, the high-speed clock signal may remain low-powered and experience less degradation.

Figure 22:
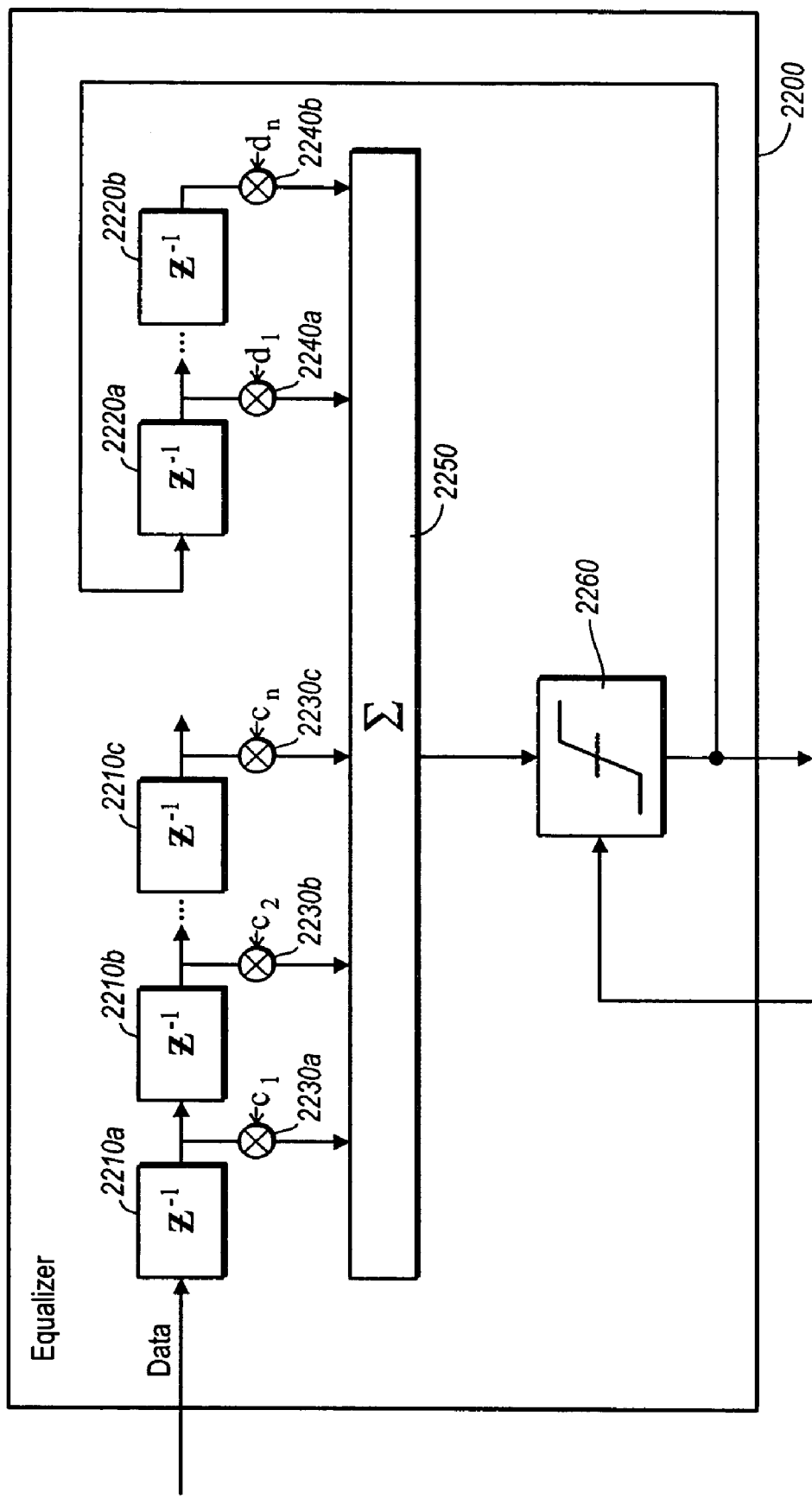
FIG. 22 illustrates an embodiment of an equalizer according to the present invention.

FIG. 22 illustrates an equalizer according to an embodiment of the present invention. A data path of the equalizer 2200 comprises a feed forward filter and a feedback path comprises a DFE. The feed forward filter, receiving analog data from an input buffer, includes a plurality of delay lines 2210a-c, a plurality of multipliers 2230a-c, a summer 2250, and a slicer 2260. The delay lines 2210a-c receive the data from the input buffer and the slicer 2260 sends the data to the output buffer. The feed back path, receiving digital data from the summer 2250, includes the slicer 2260, a plurality of delay lines 2220a,b, and a plurality of multipliers 224a,b.

The delay lines 2210a-c, 2220a,b delay the data stream so that data bits are input at individual integrators at different clock cycles. The delay lines 2210a-c, 2220a,b are coupled to receive an analog signal carrying either analog or digital data and send the data to the multipliers 2230a-c, 2240a,b. The delay lines 2210a-c, 2220a,b maybe implemented in various ways such as through analog transmission lines comprising combinations of inductors and capacitors. Preferably, the delay is a one-bit period.

The multipliers 2230a-c, 2240a,b generate a product of the data and coefficients. The multipliers 2230a-c, 2240a,b are coupled to receive the data signals and the coefficient signals and send to send a signal to the summer 2250. The summer 2250 generates a sum of the feed forward filter and the DFE. The summer 2250 is coupled to receive signals from the feed forward multipliers 2230a-c and from the DFE multipliers 2240a,b. The slicer 2260 receives the analog signal from the summer 2250 and a clock signal, and generates a digital output according to the clock signal.

In one embodiment, the equalizer 2200 outputs a digital signal from the slicer 2260 output such as in the embodiment of FIG. 20 in which the equalized signal may receive no further conditioning before a data symbol decisions are made. In another embodiment, the equalizer 2200 outputs an analog signal from the summer 2250 output such as in the embodiment of FIG. 21 in which the equalized signal is input into a CDR.

Figure 23:
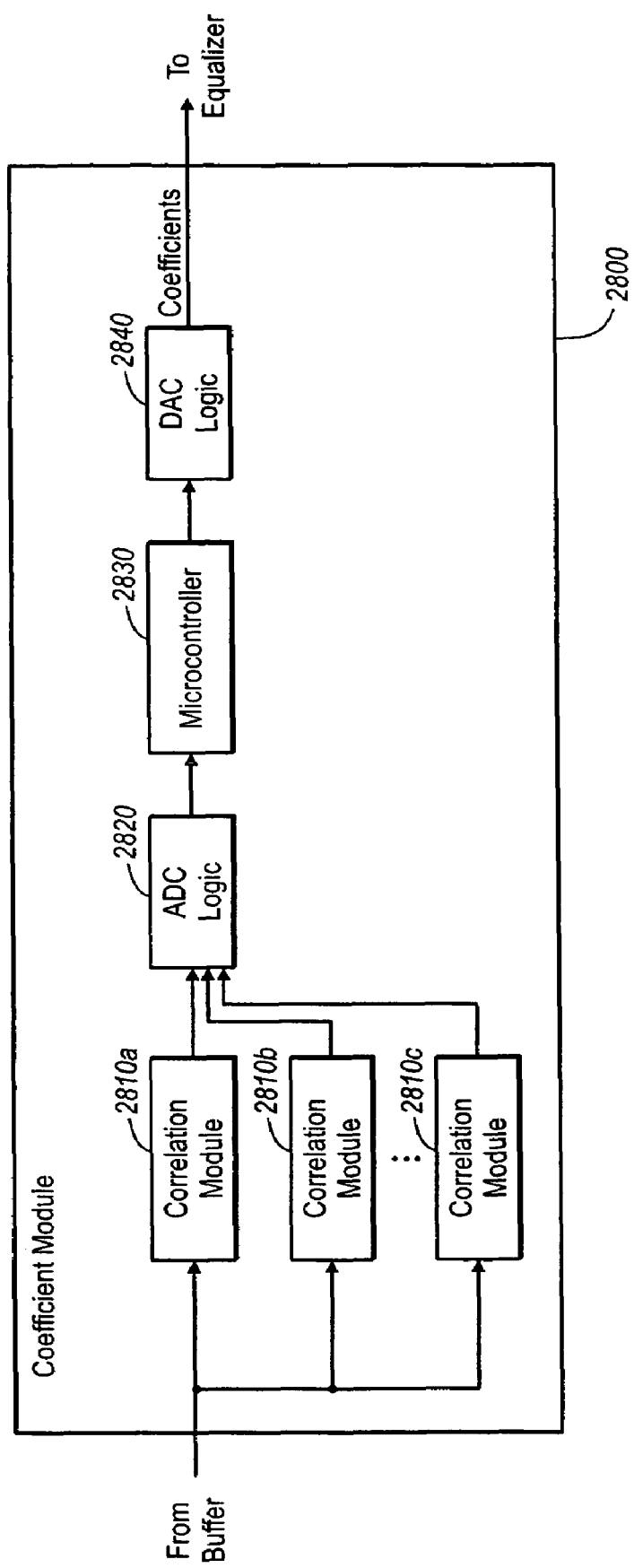
FIG. 23 illustrates a coefficient module according to an embodiment of the present invention.

FIG. 23 illustrates a coefficient module according to an embodiment of the present invention. A data path of the coefficient module 2800 comprises a bank of correlation modules 2810a-c, an ADC logic 2820, a microcontroller 2830, and a DAC logic 2840. The bank of correlation modules 2810a-c receives data from an input buffer and the DAC logic 2840 outputs a coefficient signal to an equalizer or an output buffer.

Figure 28:
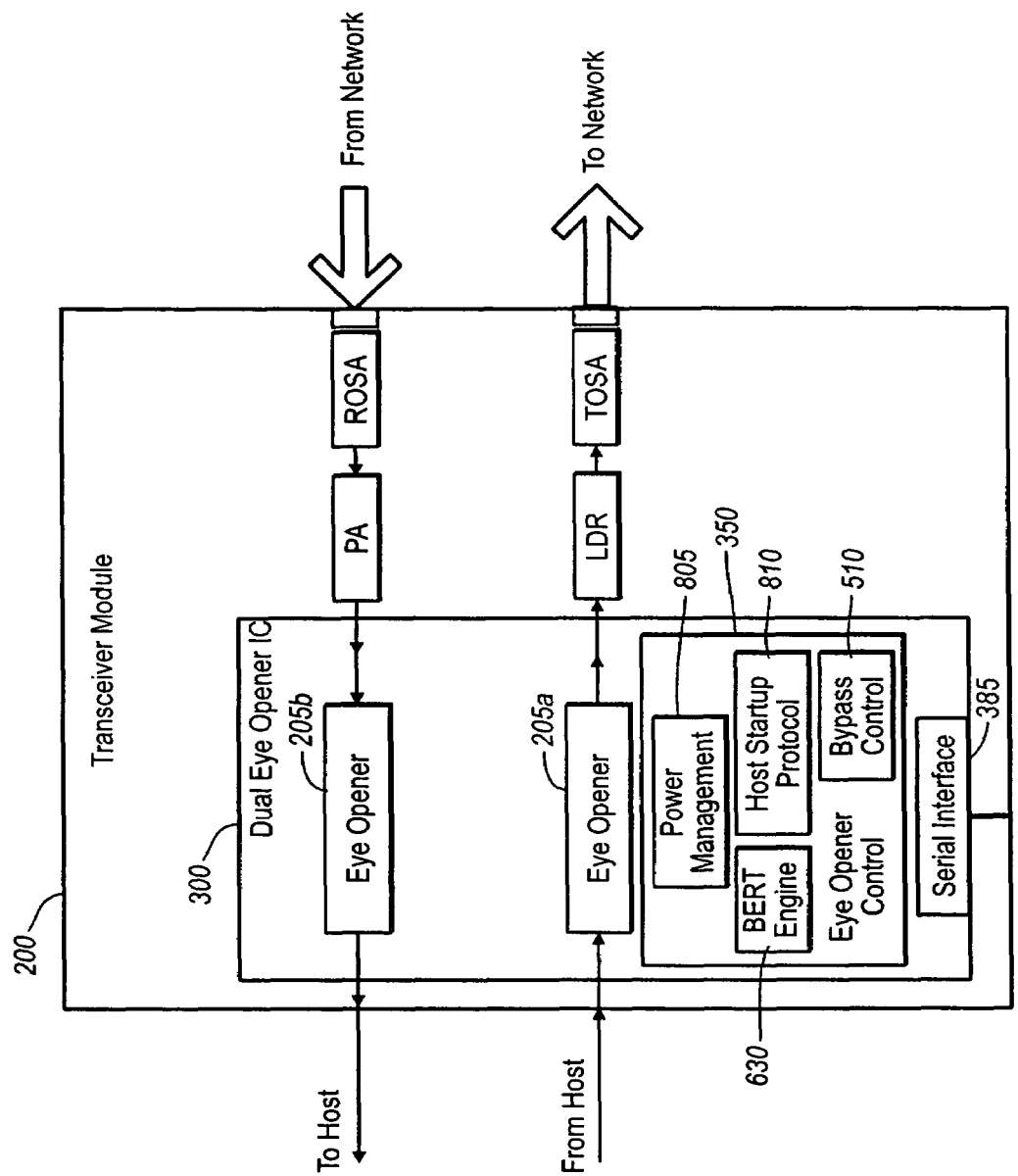
FIG. 28 is an illustration of a transceiver module having power management functionality integrated with dual eye openers according to an embodiment of the present invention.

The bank of correlation 2810a-c modules performs auto-correlation functions on the data stream. The bank of correlation modules 2810a-c receive data signals from the input buffer and send signals to the ADC logic 2820. In FIG. 28, the bank of correlation modules 2810a-c calculates $<s(t)s(t+\delta)>$, $<s^2(t)s(t+\delta)>$, and $<s(t)s^2(t+\delta)>$ for $\delta=1,2,3$, etc.

The ADC logic 2820 digitizes analog signals from the bank of correlation modules 2810a-c and sends digital signals to the microcontroller 2830. The ADC logic 2820 comprises a multiplexor to multiplex multiple inputs on a single output. The microcontroller 2830 uses algorithms to determine coefficient values according to the autocorrelation results. The microcontroller 2830 comprises a memory element such as a EEPROM for storing instructions and past coefficient values. The DAC logic 2840 generates an analog signal from the digitized output of the microcontroller 2830.

Figure 24:
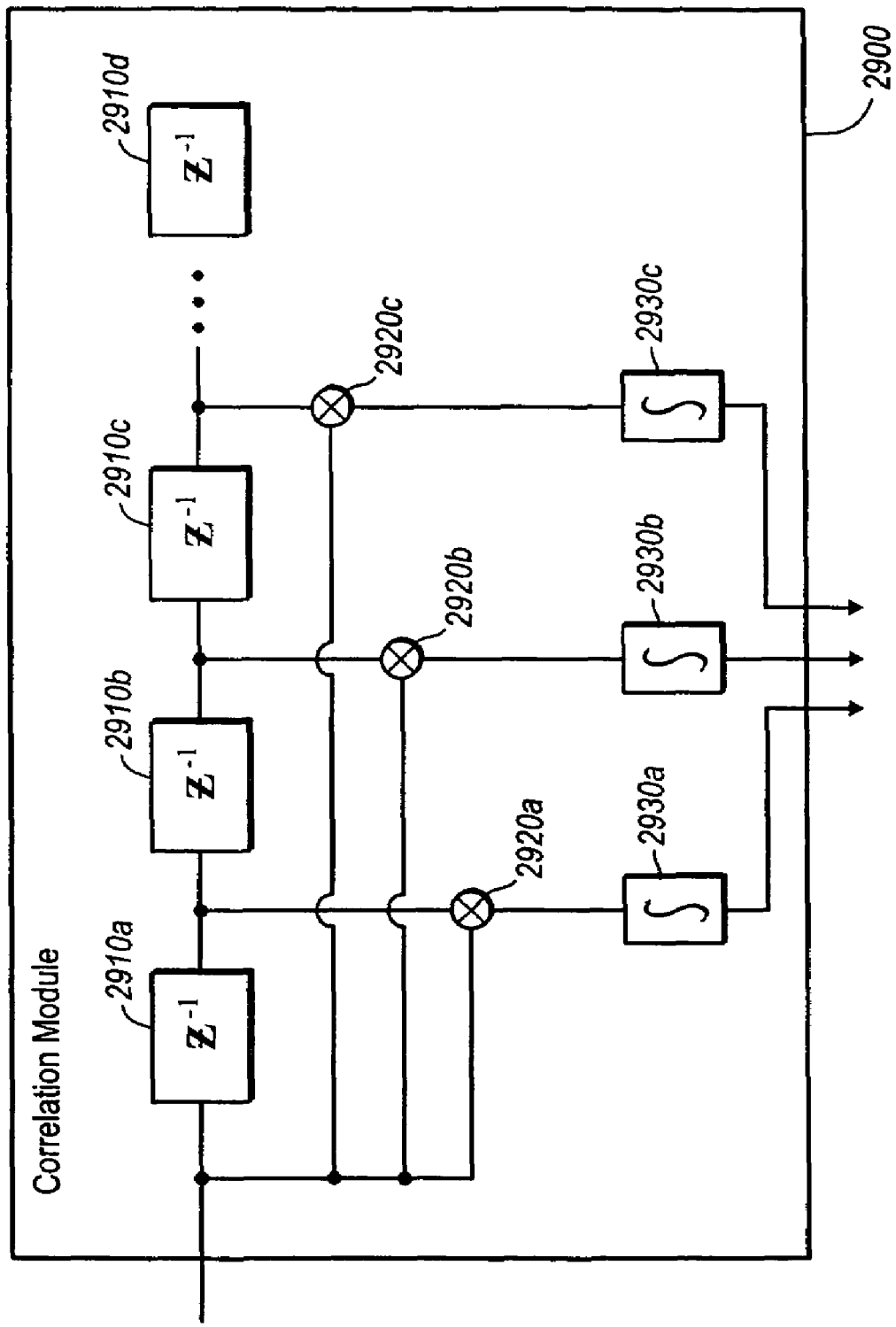
FIG. 24 illustrates a correlation module according to an embodiment of the present invention.

FIG. 24 illustrates a correlation module according to an embodiment of the present invention. The correlation module 2900 comprises a plurality of delay lines 2910a-d, a plurality of multipliers 2920a-c, and a plurality of integrators 2930a-c. The multipliers 2920a-c are preferably analog multipliers such as Gilbert cells and the integrators 2930a-c are preferably analog integrators. An advantage of the present invention is that analog circuitry determines correlations from the high-speed data input so that an output to ADC logic can be low-powered. Moreover, the correlation module 2900 generates coefficients without necessitating a training sequence.

The correlation module 2900 is configured to calculate an autocorrelation function of the signal at different times, i.e., $<s(t)s(t+\delta)>$. A first data path includes a multiplier 2920a that receives inputs directly from the data stream and after a delay line 2910a and sends an output signal to an integrator 2930a. A second data path includes a multiplier 2920b that receives inputs directly from the data stream and after two delay lines 2910a,b and sends an output signal to an integrator 2930b. A third data path includes a multiplier 2920c that receives inputs directly from the data stream and after three delay lines 2910a-c and sends an output signal to an integrator 2930c. The number and types of data paths may vary according to specific implementations within the scope of the present invention. The products are sent to a microcontroller.

Figure 25:
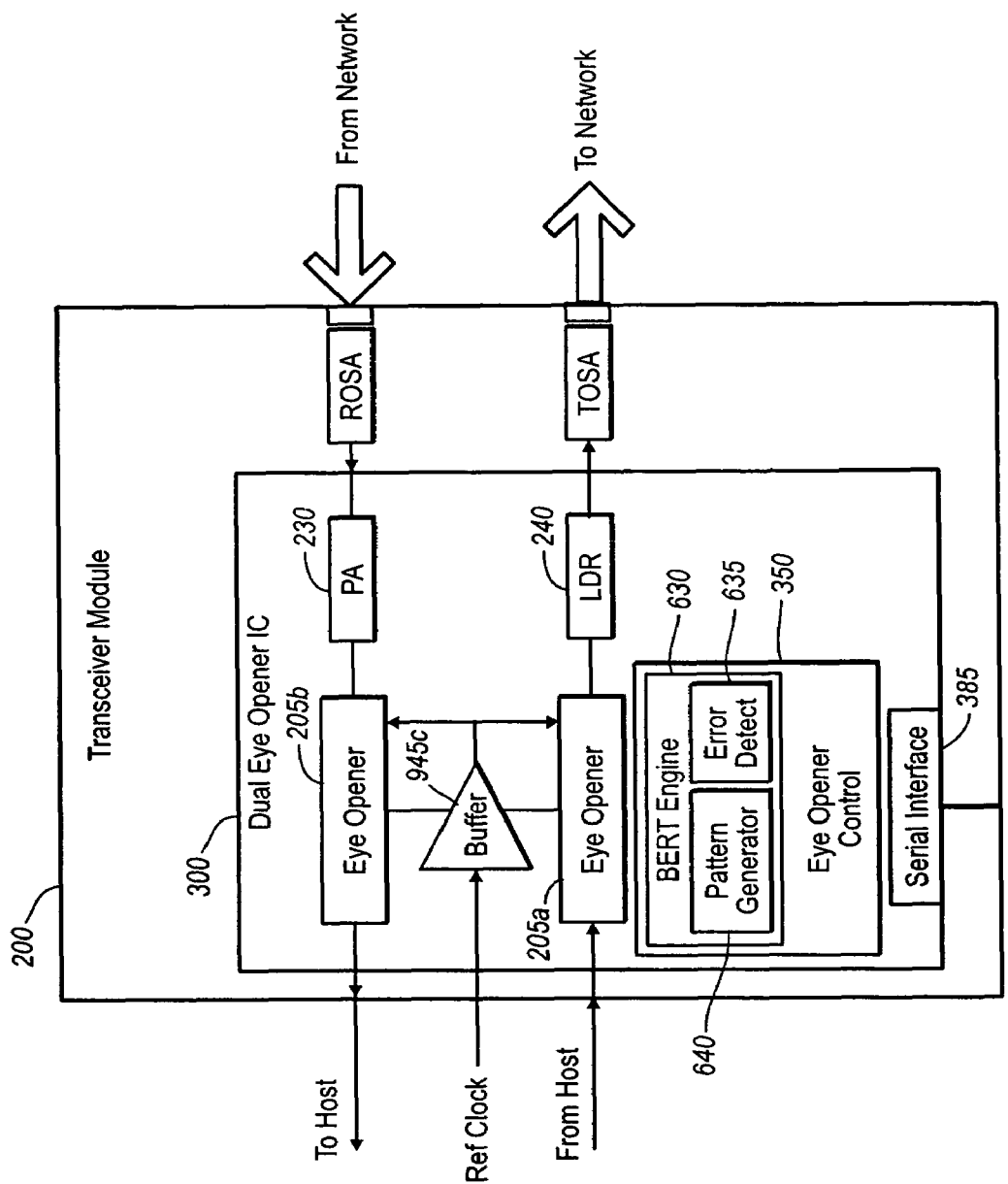
FIGS. 25-27 illustrate examples of component integration that may be implemented as part of an integrated circuit.
Figure 26:
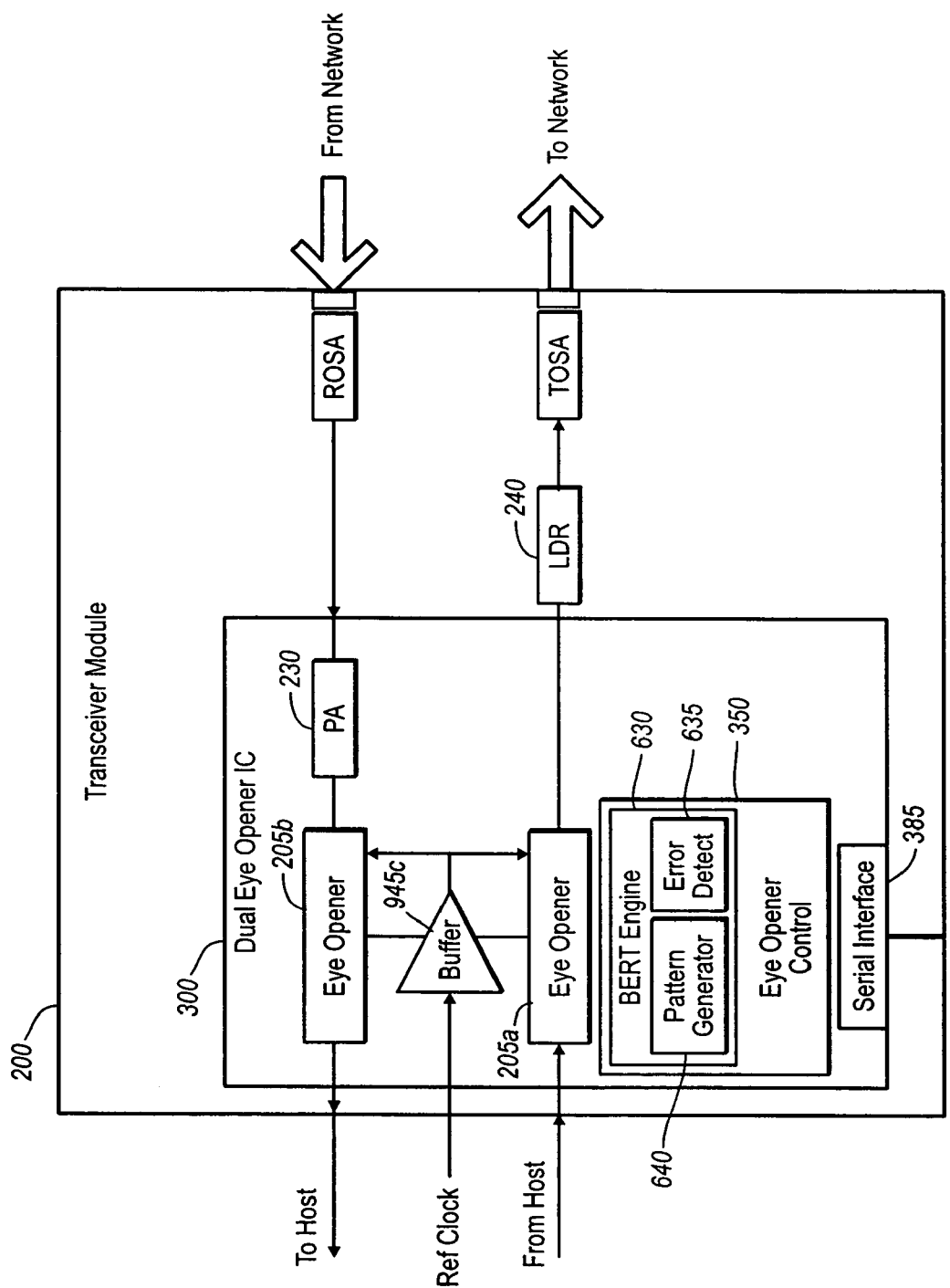
Figure 27:
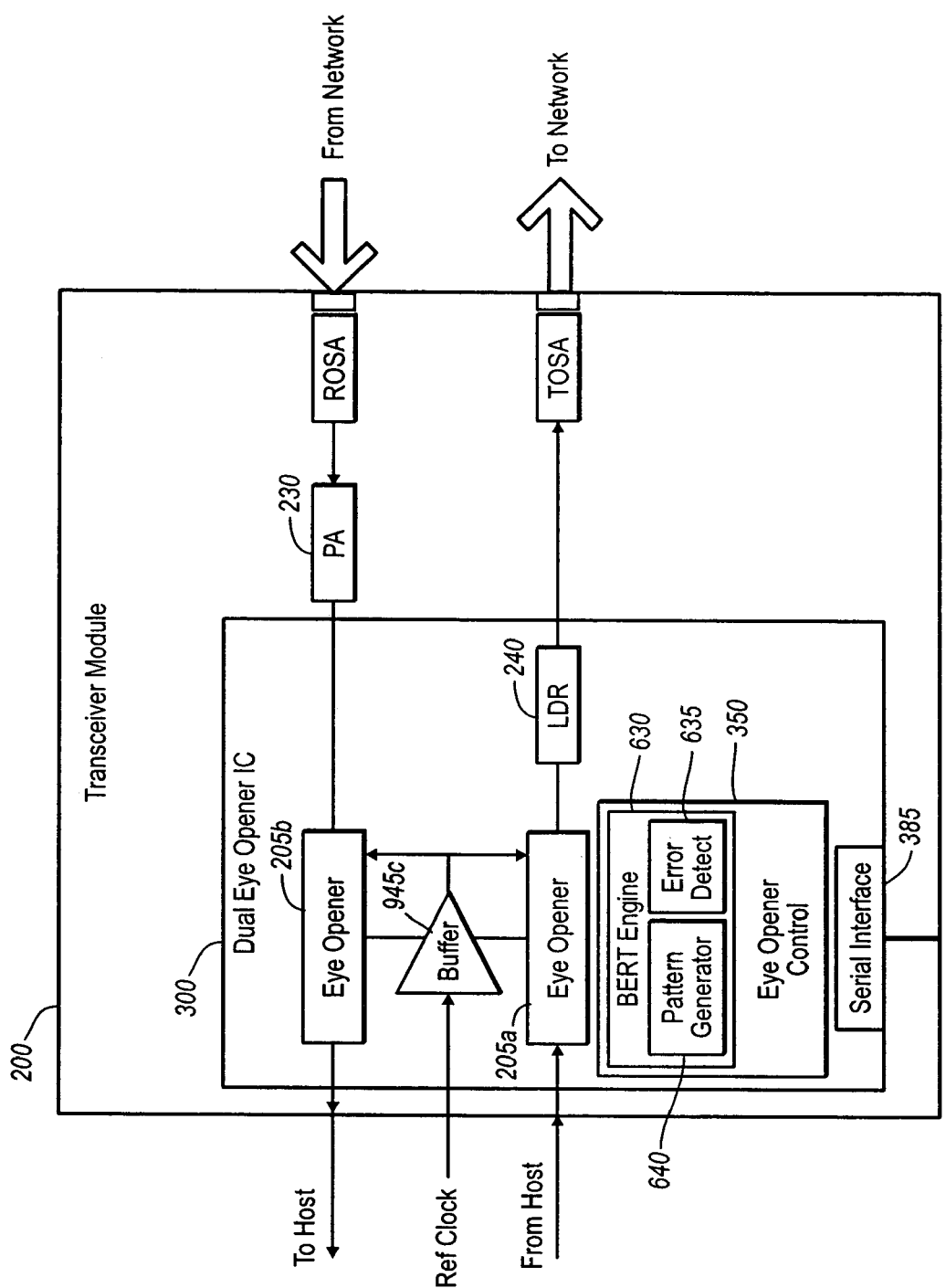

FIGS. 25-27 illustrate examples of component integration that may be implemented as part of the integrated circuit, or within a transceiver module. FIG. 25 is an illustration of a transceiver module having amplification and laser components integrated with dual eye openers according to an embodiment of the present invention. This integration reduces the size of these components on the transceiver module 200 and allows for more efficient connections between the various components. The integration of additional circuits into the eye opener may also be desirable depending on the environment in which the eye opener will operate as well as obvious benefits such as reduced pin count, reduced package size and cost, reduced power consumption, improved signal integrity, etc. Also, additional control circuitry may be integrated within the eye opener. For instance, laser bias control circuitry, signal detect circuitry, and other circuits which might otherwise be incorporated into the post amp or laser driver separately.

FIGS. 26 and 27 illustrate other examples of component integration on a transceiver module. Specifically, the post amplifier 230 may be individually integrated with the dual eye openers 205a, b and the eye opener control module 350. Comparatively, the laser driver 240 may be individually integrated with the dual eye openers 205a, 205b and the eye opener control module 350. One skilled in the art that there are numerous additional implementations of component integration on a chip substrate in accordance with the present invention.

The combinations of dual eye openers integrated with post amp and laser driver either singly or in combination may also be accomplished in the case of single eye openers 205a, b. Eye opener 205b can be integrated with the post amp or may have sufficient input sensitivity to eliminate the requirement for a post amp. The eye opener 205b may also have signal detect features or other functions that may be incorporated into a post amp of used in a receiver. Likewise, the eye opener 205a may be integrated with the laser driver and with any other circuitry that is used in a transmitter, for example laser bias control circuitry. Eye opener 205a may have provisions for adjustable output swing, adjustable edge speed of the output, and other features that may be incorporated into laser drivers.

FIG. 28 is an illustration of a transceiver module having power management functionality integrated with dual eye openers according to an embodiment of the present invention. Control of power consumption may become significant, depending on the actual design, if multiple eye openers are implemented within the module 200. Accordingly, it is desirable to minimize the power consumption of components on the eye opener integrated circuit 800. Power down modes integrated in the eye opener integrated circuit 800 allow the eye opener control module 350 to power down components that are not being utilized during a particular time period. The power down modes may be externally controlled via control lines or digital interfaces, or they may be used automatically as part of the normal operation of the integrated circuit. For example, a signal detect function that may be active with a low duty cycle (e.g., 10%) so that the circuit, which would otherwise consume a substantial amount of current, will instead only consume 10% of the amount in the absence of automatic power down. The power down may occur on the scale of microseconds so that the circuit is turned on every few hundred microseconds, for example, and is powered down the rest of the time. Other signals within the eye opener might also be designed to utilize this type of power down. In addition, other circuits in the eye opener may be powered down when the eye opener is used in a transceiver module and these signals may be specific to use of the eye opener within a transceiver or transponder module. The power down modes may also include a shutdown mode that turns off the eye opener in response to the absence of a signal for a particular period of time.

In one embodiment, a component may operate on a duty cycle. For example, the circuitry necessary for the LOS may be powered up in response to a polling of the CDR. If the LOS condition exists then the LOS signal is output. However, if the LOS condition does not exist, then a power savings is realized since the LOS will not be powered up again until the next polling.

A power management module 805 within the eye opener control module 350 dynamically controls power levels on various components on the eye opener integrated circuit 800. For example, the power management module 805 may shut down the BERT engine 630 or pass-through control 510 if they are not being used. Additionally, the power management module 805 may decrease power to a eye opener (e.g., the receiver eye opener 205b or transmitter eye opener 205a) if it is not operating and may restore power to the eye opener when needed.

In one embodiment, a host startup protocol module 810 within the eye opener control module 350 dynamically controls power levels on components during installation. For example, the host startup protocol module 810 may facilitate an initial handshaking procedure between the transceiver module 200 and the host 202 (FIG. 2). During installation, the transceiver module 200 may transmit a low power level inquiry to the host to request a start-up procedure. In response, the host 202 (FIG. 2) replies to the inquiry and the host startup protocol module 810 then powers up components on the transceiver module 200 needed to complete the setup procedure. Additionally the host 202 (FIG. 2) may communicate data describing whether its protocol operation of the dual eye openers.

The power management module 805 and host startup protocol module 810 allow components on the transceiver module 200 to operate in a sleep mode when not in use. As a result, power management efficiency is increased and heat on the chip is reduced.

Figure 29:
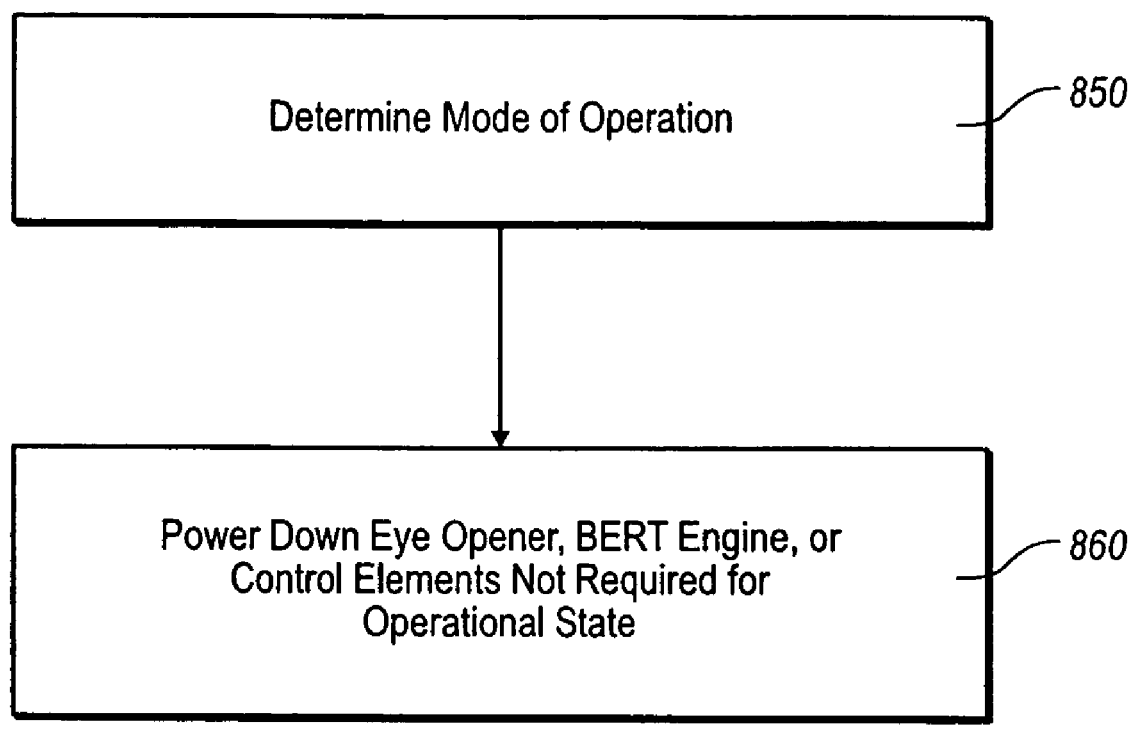
FIG. 29 is a flow chart of a method for managing power of components on a transceiver module according to an embodiment of the present invention.

FIG. 29 is a flow chart of a method for managing power of components oil a transceiver module according to an embodiment of the present invention. In particular, a mode of operation is determined 850 such as a mode not requiring a BERT engine. In response, components not required for this mode may be powered down 860 such as a BERT engine for the mode of operation in the example above.

The present invention provides several benefits over conventional transceiver modules. A first benefit is that is may be used to improve the performance of XFP transceiver modules. XFP transceiver modules are small form factor optical modules operating at a data rate of approximately 10 Gb/s.

Another benefit of the present invention is that the transceiver module may be plugged into serial connectors on a host reducing the number of SERDES components on both the host and transceiver module. Dual eye openers may be placed in the transmit and receive paths to ensure that data streams remain within a predefined jitter budget. The removal of SERDES components decreases the amount of heat on the transceiver chip(s), decreases the component cost, and reduces the required area on a chip substrate for components.

An additional benefit of the present invention is that particular functionalities may be integrated on the transceiver module. A first functionality is providing control of various components, including dual eye openers, via a serial connection. This serial connection reduces the number of pins and connections required to control the transceiver module. A second functionality is providing multiple loopback modes that may be used to test components and data paths on both the transceiver module and optical paths on an attached network. Furthermore, a BERT engine may be integrated on the module to further enhance this testing and monitoring capability of the loopback modes. These functionalities lower the manufacturing costs and installation costs because the internal testing described above provides more efficient and cost effective methods of testing than conventional testing procedures.

Still yet another benefit of the present invention is that a pass-through functionality may be integrated on the transceiver module. This pass-through function allows the transceiver module to operate in different networking environments having different data rates and eye opener requirements.

The present invention may also include power management functionality that is integrated on the transceiver module. This power management function allows the dynamic control of power to components on the module during both operation and installation. As a result, power is conserved and heat reduced on the chips.

One embodiment of the invention finds particular usefulness in applications where a pinout for a module that has been defined such as through a Multi Source Agreement (MSA). For example, the MSA for certain Small Form Factor Pluggable (SFP) devices defines a module with a 20 pin package. The MSA for the SFP transceiver 20 pin package does not specify the use of a CDR. Thus, under the MSA there is no provision for input of an external clock used by a CDR. At lower data rates, appropriate signal processing may be accomplished without the use of a CDR. However, higher data rates may be recovered more easily by using a CDR and thus a clock signal may be needed. However, the 20 pin package or other package design should still conform to the MSA or some other standard design.

Figure 30:
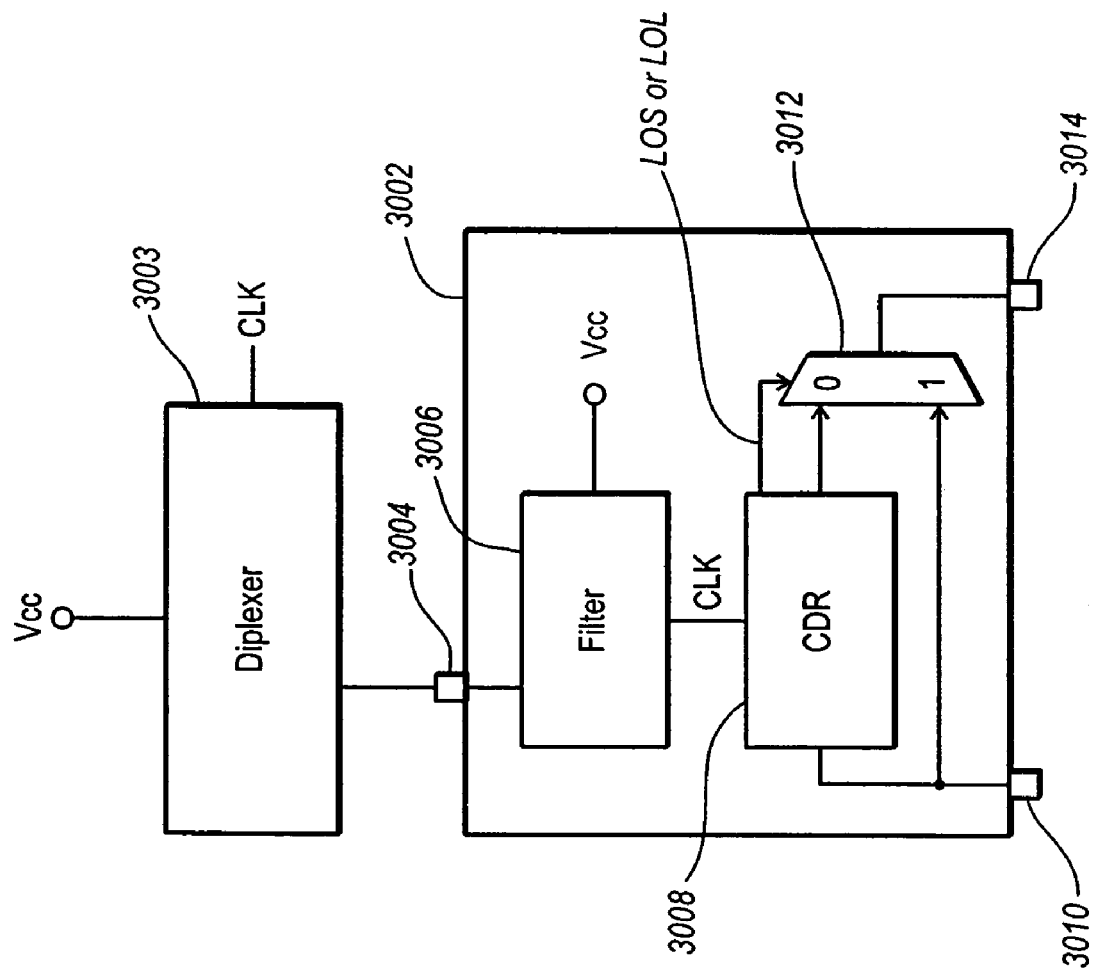
FIG. 30 is an illustration of a diplexed transceiver module.

Thus, in one embodiment an external clock is made available to an integrated circuit by diplexing the clock with an input signal or power supply input. For example, an external clock supplied by a host device such as host 202 shown in FIG. 2, may be combined with another input into an integrated circuit chip. Such an example is shown in FIG. 30. In the embodiment shown, the external clock is diplexed with the supply voltage Vcc that powers the integrated circuit chip 3002 using a diplexer 3003. This diplexed signal is provided to a clock pin 3004 that also serves as the power supply pin for the integrated circuit chip 3002. Internally, the integrated circuit chip 3002 includes a filter 3006 that separates the clock signal from Vcc. The filter 3006 may be active or passive, with the diplexed signal being used as the power to power an active filter. Diplexing the clock signal onto Vcc forms a signal that appears to the integrated circuit 3002 as a supply voltage with a ripple. Most integrated circuits are designed to be impervious to some ripple. Thus, if the clock signal is sufficiently small with respect to Vcc, the integrated circuit 3002 will not be seriously affected by using the diplexed signal as a supply. In one embodiment, the clock signal may be about 10% or less ripple on the Vcc. Alternatively, when the clock signal has been filtered from Vcc, Vcc output from the filter 3006 may be used to power the integrated circuit 3002 such that the integrated circuit 3002 will be powered by a supply voltage with less ripple. Other inputs may be used to diplex the clock signal including the data input 3010 or other control signals including signals such as a rate control pin, a transmit disable pin, an Loss of Signal (LOS) pin, a transmit fault pin and the like.

The clock signal from the filter 3006 is supplied to a CDR 3008 or other eye opening circuit for use in retiming an input signal from a data input pin 3010 which is connected to the CDR 3008. The CDR output is connected to one input of a multiplexer 3012. The input pin 3010 is connected to a different input of the multiplexer 3012. The multiplexer 3012 is part of a bypass circuit that is configured to selectively bypass the CDR 3008. The multiplexer may be controlled by a Loss of Signal (LOS) or Loss of Lock (LOL) signal from the CDR 3008 or from some other control signal. For example, when the data rate of data input at the data input pin 3010 is below a certain level, the multiplexer 3012 may be set to cause a data input to bypass the CDR 3008. The output from the multiplexer 3012 is delivered to an output pin 3014 for use by a device external to the integrated circuit 3002. At higher data rates, the multiplexer 3012 is set to deliver a retimed data signal from the CDR 3008 to the output pin. When the CDR 3008 is bypassed, the CDR 3008 may be powered down to conserve power in the integrated circuit 3002.

One embodiment of the invention may include functional elements that perform a specific operation or function. For example, one embodiment of the invention may include an apparatus for handling data. The apparatus may include means for receiving a data stream. Such means may include for example the data input pin 3010 shown in FIG. 30. Other means may include appropriate printed circuit board traces, connectors and the like.

An embodiment may include means for receiving a clock signal that has been diplexed with another signal or voltage. The means may include for example, one or both of the clock pin 3004 and the filter 3006. Other appropriate printed circuit board traces, connector, filter circuit, timing circuits and/or the like may be included as examples of means for receiving a clock signal.

An embodiment may include, means for selectively retiming the data stream using the clock signal or bypassing retiming the data stream. The means for selectively retiming the data stream using the clock signal or bypassing retiming the data stream may include for example, one or both of the CDR 3008 and/or the multiplexer 3012. For example, the multiplexer may be used to select whether a signal retained from the CDR 3008 or a signal that bypasses the CDR 3008 is output as an output signal. Other appropriate circuits or switching devices may also be used as the means for selectively retaining the data stream using the clock signal or bypassing retiming the data stream.

An embodiment of the invention may include means for transmitting the retained data stream. This means may include for example, the output pin 3014. The multiplexer 3012 may be included in this means. Other appropriate connectors, circuit board traces and circuits may be included in the means for transmitting the retimed data stream.

The embodiment described in FIG. 30 refers to bypassing the CDR 3008. Those of skill in the art will understand that bypassing may also refer to a signal being output at the output pin 3014 that has not passed through the CDR 3008 even when an input signal has been fed into the CDR 3008. Thus bypassing, as used herein does not necessarily prevent the CDR 3008 from operating on the signal, but rather may make available a signal that has not passed through the CDR 3008 or that has not been retimed using the clock signal.

While the present invention has been described in detail in regards to a transceiver, it will be understood from the above description that embodiments of the present invention may be applied to a device where a parallel data path is connected to the device such as a transponder.

While the present invention has been described with reference to certain preferred embodiments, those skilled in the art will recognize that various modifications may be provided. For example, other types of circuits may be used to reduce jitter or open an eye diagram at a transceiver or transponder module. For example, both passive and adaptive equalization circuits may be used for these purposes. Also, one skilled in the art will recognize that the above description may apply to reclocking circuitry as well. Accordingly, the functionalities described above are not meant to be limited to an eye opener, but may be used in a number of circuits used to improve a signal such as signal conditioners or eye openers. Variations upon and modifications to the preferred embodiments are provided for by the present invention, which is limited only by the following claims.

What is claimed is:

1. An integrated circuit usable in a transceiver module, the integrated circuit comprising:
   an input port configured to receive a data stream;
   a clock port configured to receive a reference clock signal diplexed with another signal or voltage used by the integrated circuit;
   an eye opening circuit coupled to the input port and clock port, the eye opening circuit configured to retime the data stream received at the input port;
   an output port coupled to the eye opening circuit, the output port configured to transmit a retimed signal from the eye opening circuit to a device external to the integrated circuit; and
   a bypass circuit coupled to the input port and the output port, wherein the bypass circuit is configured to selectively bypass the eye opening circuit.

2. The integrated circuit of claim 1, wherein the clock port comprises a Vcc port configured to receive a supply voltage for the integrated circuit.

3. The integrated circuit of claim 1, wherein the clock port comprises at least one of a rate control pin, a transmit disable pin, a Loss of Signal pin, and a transmit fault pin.

4. The integrated circuit of claim 1, wherein the bypass circuit is selected to bypass the eye opening circuit upon receipt of a loss of signal (LOS) signal.

5. The integrated circuit of claim 1, wherein the bypass circuit is selected to bypass the eye opening circuit upon receipt of a loss of lock (LOL) signal.

6. The integrated circuit of claim 1, wherein the bypass circuit is selected to bypass the eye opening circuit when a data rate of a data stream at the input port is below a predetermined threshold.

7. The integrated circuit of claim 1, further comprising pin connections complying with the SFP Multi Source Agreement.

8. The integrated circuit of claim 1, wherein the eye-opener circuit comprises an adaptive equalizer configured to remove channel effects.

9. An integrated circuit usable in a transceiver module, the integrated circuit comprising:
   an input port configured to receive a data stream;
   a clock port configured to receive a reference clock signal diplexed with another signal or voltage used by the integrated circuit, wherein the clock port comprises a Vcc port configured to receive a supply voltage for the integrated circuit;
   an eye opening circuit coupled to the input port and clock port, the eye opening circuit configured to retime the data stream received at the input port;
   an output port coupled to the eye opening circuit, the output port configured to transmit a retimed signal from the eye opening circuit to a device external to the integrated circuit, wherein the clock port is configured to receive a clock signal diplexed with Vcc when the clock signal is about 10% or less the magnitude of Vcc.

10. A method of handling data comprising:
    receiving a data stream;
    receiving a clock signal that has been diplexed with another signal or voltage;
    selectively retiming the data stream using the clock signal or bypassing retiming the data stream;
    transmitting the retimed or bypassed data stream; and
    powering down a clock and data recovery circuit when the act of bypassing retiming the data stream is performed.

11. The method of claim 10, further comprising receiving a loss of lock (LOL) signal to selectively bypass retiming the data stream.

12. The method of claim 10, further comprising receiving a loss of signal (LOS) signal to selectively bypass retiming the data stream.

13. The method of claim 10, wherein receiving a clock signal comprises receiving the clock signal diplexed with a Vcc voltage.

14. The method of claim 10, wherein receiving a clock signal comprises receiving the clock signal diplexed with at least one of a rate control signal, a transmit disable signal, a Loss of Signal signal, and a transmit fault signal.

15. The method of claim 10, further comprising equalizing the data stream to remove channel effects.

* * * * *